(12) United States Patent
Kusaka et al.

(10) Patent No.: US 8,023,007 B2
(45) Date of Patent: Sep. 20, 2011

(54) AUTOMATIC FILE TRANSMISSION SYSTEM

(75) Inventors: Hiroya Kusaka, Hyogo (JP); Shigeo Sakaue, Osaka (JP); Michiharu Uematsu, Osaka (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 09/979,483

(22) PCT Filed: Mar. 14, 2001

(86) PCT No.: PCT/JP01/01999
§ 371 (c)(1),
(2), (4) Date: Jan. 30, 2002

(87) PCT Pub. No.: WO01/69395
PCT Pub. Date: Sep. 20, 2001

(65) Prior Publication Data
US 2003/0007189 A1    Jan. 9, 2003

(30) Foreign Application Priority Data
Mar. 14, 2000   (JP) .................................. 2000-070032

(51) Int. Cl.
*H04N 5/76* (2006.01)
(52) U.S. Cl. ............. 348/231.99; 348/231.2; 348/231.3; 348/231.4; 348/231.7; 348/211.1
(58) Field of Classification Search ............... 348/207.1, 348/211.3, 231.2, 231.7, 211.1, 231.99, 231.4
See application file for complete search history.

(56) References Cited

U.S. PATENT DOCUMENTS

| | | | | |
|---|---|---|---|---|
| 5,095,445 | A | * | 3/1992 | Sekiguchi ...................... 709/246 |
| 5,493,335 | A | * | 2/1996 | Parulski et al. ............. 348/231.6 |
| 5,537,626 | A | | 7/1996 | Kraslavsky et al. |
| 5,802,314 | A | * | 9/1998 | Tullis et al. ................... 709/246 |
| 5,806,005 | A | | 9/1998 | Hull et al. |
| 5,829,044 | A | * | 10/1998 | Sono ............................ 711/156 |
| 5,898,165 | A | * | 4/1999 | Kinugasa et al. ............. 235/492 |
| 5,933,478 | A | * | 8/1999 | Ozaki et al. ................ 379/93.24 |
| 6,085,222 | A | | 7/2000 | Fujino et al. |
| 6,141,111 | A | | 10/2000 | Kato |
| 6,181,870 | B1 | | 1/2001 | Okada et al. |

(Continued)

FOREIGN PATENT DOCUMENTS
EP    0 689 206 A1    12/1995
(Continued)

OTHER PUBLICATIONS
Supplementary European Search Report for EP 01 91 2342, dated Aug. 29, 2006.
(Continued)

*Primary Examiner* — Yogesh K Aggarwal
(74) *Attorney, Agent, or Firm* — RatnerPrestia

(57) ABSTRACT

For automatically transmitting an image file, a system transmits the file automatically through specifically specifying information for file transmission such as an address of a destination. The system includes a memory for storing a data file and an automatic transmission control file for briefly describing information of a file name of the file to be transmitted and a destination address, and a communication unit for transmitting the data file according to the automatic transmission control file. Therefore, the system can transmit the data file automatically only by having a memory storing the data file and automatic transmission control file connected to the communication unit.

28 Claims, 24 Drawing Sheets

| Line No. | Contents |
|---|---|
| 1 | GID=001 |
| 2 | SEND_SRC = (File Name of Image File B) |
| 3 | SEND_ADR = "AAA@BBB.ne.jp" |
| 4 | USR_ADR = "CCC@DDD.com" |
| 5 | USR_TEL = "8166YYYYYY" |
| 6 | SEND_TTL = "Hello" |
| 7 | SEND_MSG = "Good Morning!" |
| 8 | USR_NAM = "TARO NIPPON" |
| 9 | GID=002 |
| 10 | SEND_SRC = (File Name of Audio File B) |
| 11 | SEND_ADR = "EEE@FFF.ne.jp" |
| 12 | USR_ADR = "CCC@DDD.com" |
| 13 | USR_TEL = "8166YYYYYY" |
| 14 | SEND_TTL = "Bye" |
| 15 | SEND_MSG = "Thank You" |
| 16 | USR_NAM = "TARO NIPPON" |

U.S. PATENT DOCUMENTS

| | | | |
|---|---|---|---|
| 6,442,252 B1 * | 8/2002 | Fujise et al. | 379/100.01 |
| 6,573,927 B2 * | 6/2003 | Parulski et al. | 348/32 |
| 6,642,959 B1 | 11/2003 | Arai | |
| 6,650,343 B1 * | 11/2003 | Fujita et al. | 345/760 |
| 6,665,083 B1 * | 12/2003 | Nakajima et al. | 358/1.15 |
| 6,784,924 B2 * | 8/2004 | Ward et al. | 348/207.1 |
| 6,801,340 B1 * | 10/2004 | Endo | 358/403 |
| 2001/0043786 A1 * | 11/2001 | Takahashi et al. | 386/46 |
| 2003/0012559 A1 | 1/2003 | Kusaka et al. | |
| 2003/0018717 A1 | 1/2003 | Haley et al. | |
| 2003/0090710 A1 | 5/2003 | Kusaka et al. | |
| 2005/0088690 A1 | 4/2005 | Haneda et al. | |
| 2005/0144189 A1 | 6/2005 | Edwards et al. | |
| 2007/0041714 A1 | 2/2007 | Kusaka et al. | |

FOREIGN PATENT DOCUMENTS

| | | |
|---|---|---|
| EP | 0 730 272 A2 | 9/1996 |
| EP | 0 838 774 A2 | 4/1998 |
| EP | 0 860 829 A2 | 8/1998 |
| EP | 0 860 980 A2 | 8/1998 |
| EP | 0 912 036 A2 | 4/1999 |
| EP | 0 965 991 A1 | 12/1999 |
| EP | 0 994 480 A1 | 4/2000 |
| JP | 5-274232 A | 10/1993 |
| JP | 6-214904 | 8/1994 |
| JP | 07-114634 | 5/1995 |
| JP | 7-184106 | 7/1995 |
| JP | 8-115278 | 5/1996 |
| JP | 08-242326 | 9/1996 |
| JP | 09-146918 | 6/1997 |
| JP | 09-179806 | 7/1997 |
| JP | 10-051733 | 2/1998 |
| JP | 10-065889 | 3/1998 |
| JP | 10065889 A * | 3/1998 |
| JP | 10-097639 | 4/1998 |
| JP | 10-224745 | 8/1998 |
| JP | 10-234002 | 9/1998 |
| JP | 10-283759 | 10/1998 |
| JP | 10-304292 | 11/1998 |
| JP | 11-55324 | 2/1999 |
| JP | 11-88808 | 3/1999 |
| JP | 11-143803 | 5/1999 |
| JP | 11-232440 | 8/1999 |
| JP | 11-313273 | 11/1999 |
| JP | 2000-29800 A | 1/2000 |
| JP | 2000-041212 | 2/2000 |
| JP | 2000-276418 | 10/2000 |
| JP | 2005-228162 | 2/2010 |
| WO | WO 99/48289 | 9/1999 |

OTHER PUBLICATIONS

International Search Report for PCT/JP01/02000 dated Jun. 12, 2001.

European Search Report for Application No. EP 01 91 2343, dated Jul. 10, 2006.

International Search Report for PCT/JP01/09402 dated Dec. 25, 2001.

US Office Action for U.S. Appl. No. 12/421,147, filed Apr. 15, 2010, Panasonic Corporation.

International Search Report corresponding to application No. PCT/JP01/01999 dated May 29, 2001.

English translation of PCT/ISA/210.

Office Action for U.S. Appl. No. 12/421,147, filed Oct. 7, 2010, Panasonic Corporation.

* cited by examiner

Fig. 7

| Line No. | Contents |
|---|---|
| 1 | GID=001 |
| 2 | SEND_SRC= (File Name of Image File B) |
| 3 | SEND_ADR="AAA@BBB.ne.jp" |
| 4 | USR_ADR="CCC@DDD.com" |
| 5 | USR_TEL="8166YYYYYY" |
| 6 | SEND_TTL="Hello" |
| 7 | SEND_MSG="Good Morning!" |
| 8 | USR_NAM="TARO NIPPON" |

Fig. 9

| Line No. | Contents |
|---|---|
| 1 | GID=001 |
| 2 | SEND_SRC= (File Name of Image File B) |
| 3 | SEND_SRC= (File Name of Audio File A) |
| 4 | SEND_ADR="AAA@BBB.ne.jp" |
| 5 | USR_ADR="CCC@DDD.com" |
| 6 | USR_TEL="8166YYYYYY" |
| 7 | SEND_TTL="Hello" |
| 8 | SEND_MSG="Good Morning!" |
| 9 | USR_NAM="TARO NIPPON" |

Fig. 10

| Line No. | Contents |
|---|---|
| 1 | GID=001 |
| 2 | SEND_SRC = (File Name of Image File B) |
| 3 | SEND_ADR = "AAA@BBB.ne.jp" |
| 4 | USR_ADR = "CCC@DDD.com" |
| 5 | USR_TEL = "8166YYYYYY" |
| 6 | SEND_TTL = "Hello" |
| 7 | SEND_MSG = "Good Morning!" |
| 8 | USR_NAM = "TARO NIPPON" |
| 9 | GID=002 |
| 10 | SEND_SRC = (File Name of Audio File B) |
| 11 | SEND_ADR = "EEE@FFF.ne.jp" |
| 12 | USR_ADR = "CCC@DDD.com" |
| 13 | USR_TEL = "8166YYYYYY" |
| 14 | SEND_TTL = "Bye" |
| 15 | SEND_MSG = "Thank You" |
| 16 | USR_NAM = "TARO NIPPON" |

Fig. 13

| Line No. | Contents |
|---|---|
| 1 | GID=001 |
| 2 | SEND_SRC=(File Name of Image File B) |
| 3 | SEND_FAX="8166XXXXXXX" |
| 4 | USR_ADR="CCC@DDD.com" |
| 5 | USR_TEL="8166YYYYYYY" |
| 6 | SEND_TTL="Hello" |
| 7 | SEND_MSG="Good Morning!" |
| 8 | USR_NAM="TARO NIPPON" |

Fig. 18

| Line No. | Contents |
|---|---|
| 1 | GID=001 |
| 2 | SEND_SRC= (File Name of Image File B) |
| 3 | SEND_DEV="HDD" |

Fig. 22

| Line No. | Contents |
|---|---|
| 1 | GID=001 |
| 2 | SEND_SRC= (File Name of Converted Image File B) |
| 3 | SEND_ADR="AAA@BBB.ne.jp" |
| 4 | USR_ADR="CCC@DDD.com" |
| 5 | USR_TEL="8166YYYYYY" |
| 6 | SEND_TTL="Hello" |
| 7 | SEND_MSG="Good Morning!" |
| 8 | USR_NAM="TARO NIPPON" |

…

AUTOMATIC FILE TRANSMISSION SYSTEM

This Application is a U.S. National Phase Application of PCT International Application PCT/JP01/01999.

TECHNICAL FIELD

The present invention relates to an automatic file transmission system for transmitting or moving a data file of image signals or audio signals taken by, for example, a digital still camera or digital video camera.

BACKGROUND ART

An image transmission device using a digital camera is disclosed in Japanese Laid-open Patent No. 11-88808. As shown in FIG. 24, this device generates a file name of an image file 2401 selected by a user on a digital camera as a communication management information file 2402 on a memory card (flash memory card). A communication controller 2405 in FIG. 24 acquires, from the communication management information file 2402 in the memory card through a communication management information acquisition unit 2404, the file name of an image file to be transmitted outside by communication, and instructs a communication unit 2403 to transmit the image file sequentially.

The conventional device however manages only the file name of the image file to be transmitted outside in the communication management information file 2402. Therefore, the device can specify the image file in the communication device such as mobile phone or modem, but cannot specify a destination. Accordingly, the user, when transmitting the image file, set the destination again with the communication device such as mobile phone.

As compared with the conventional device, the invention presents a technique of transmitting an image data file or the like automatically only by providing the file to be transmitted with a file of managing specific information like a destination, and by connecting a storing medium storing the data file and the file of the information like the destination to a communication device such as mobile phone.

SUMMARY OF THE INVENTION

To solve the above problems, an automatic file transmission system in a first aspect of the invention includes a memory for storing a data file and a transmission information file storing information about transmission of the data file. The transmission information file contains at least one group which includes information about transmission of the data file and at least one piece of information for specifying the data file to be transmitted.

More specifically, the information about transmission of the data file in one group contained the transmission information file may include information for specifying at least one destination and information for specifying at least one data file to be transmitted.

The information for specifying the destination in the transmission information file may be one of an electronic mail address of the destination, a facsimile number of the destination, and a telephone number of the destination.

The information for specifying the data file to be transmitted in the transmission information file may be a file name of the data file to be transmitted.

The transmission information file may contain at least one of an electronic mail address of the destination, a facsimile number of the destination, and a telephone number of the destination.

Further, the transmission information file may contain at least one of an electronic mail address of a sender, a facsimile number of the sender, a telephone number of the sender, a name of the sender, a title of transmission information, and a message to the destination.

The system of the first aspect of the invention may include a communication unit for transmitting the data file according to the transmission information file.

In such configuration, the system can transmit the data file automatically only through including the memory storing the data file and the information about transmission of the data file connected to the communication unit.

Plural groups of transmission information file allow a common or different data file to be automatically transmitted to plural destinations.

An automatic file transmission system in a second aspect of the invention to solve the problems includes a memory for storing a data file and information about transmission of the data file, a converter for converting the data file into other format, and a communication unit for transmitting information converted by the converter according to the information about transmission of the data file.

In the second aspect of the invention, the converter can convert the data file into at least one of a signal in a format conforming to the standard of facsimile transmission, a signal in a format conforming to the standard of fixed telephone transmission, and a signal in a format conforming to the standard of mobile communication.

Also in the second aspect of the invention, the communication unit can transmit information by facsimile transmission, can transmit information by fixed telephone transmission, or can transmit information by mobile communication.

In such configuration, the system can transmit the data file automatically since the converter specifies a signal format and communication format conforming to a device at a destination, only through including the memory storing the data file and the information about transmission of data file connected to the communication unit.

An automatic transmission system in a third aspect of the invention to solve the problems includes a first memory for storing a data file and information about move of the data file, a second memory capable of storing the data file, and moving unit for moving the data file from the first memory to the second memory according to the information about move of the data file.

In the third aspect of the invention, the information about move of the data file contains at least the information showing the device at the destination of move.

Further, in the third aspect of the invention, the moving unit may duplicate the data file in the second memory.

In such configuration, the system can move the data file automatically to the second memory, only though including the first memory storing the data file and the information about move of data file connected to the moving unit.

A fourth aspect of the invention to solve the problems relates to an automatic transmission system including a memory for storing a data file and information about transmission of the data file and communication unit for transmitting the data file according to the information about transmission of the data file. The information about the automatic file transmission system is stored in the memory.

In the fourth aspect of the invention, the information about the automatic file transmission system includes information about communication unit.

In such configuration, the system can transmit the data file automatically, only through including the memory storing the data file and the information about transmission of data file connected to the communication unit.

More specifically, the data file to be transmitted or moved may include a file containing image information, a file containing audio information, a file containing multiplexed image information and audio information, a text file, an executable program, and an HTML format file.

In these aspects of the invention, the memory may be detachable.

The communication unit can transmit a file by wireless communication or wired communication. These various manners allow a variety of data to be transmitted automatically or to be moved automatically. Since the memory may be detachable, the data can be moved easily from a generating device to a transmitting or moving device, and the data can be transmitted or moved by any transmitter.

BRIEF DESCRIPTION OF THE DRAWINGS

FIG. 7 is a diagram showing the content of automatic transmission control file of embodiment 1.

FIG. 9 is a diagram showing the content of automatic transmission control file for transmitting plural files of embodiment 1.

FIG. 10 is a diagram showing the content of automatic transmission control file of embodiment 2.

FIG. 13 is a diagram showing the content of automatic transmission control file of embodiment 3.

FIG. 18 is a diagram showing the content of automatic transmission control file of embodiment 4.

FIG. 22 is a diagram showing the content of automatic transmission control file of embodiment 5.

BEST MODE FOR CARRYING OUT THE INVENTION

Figure 1:
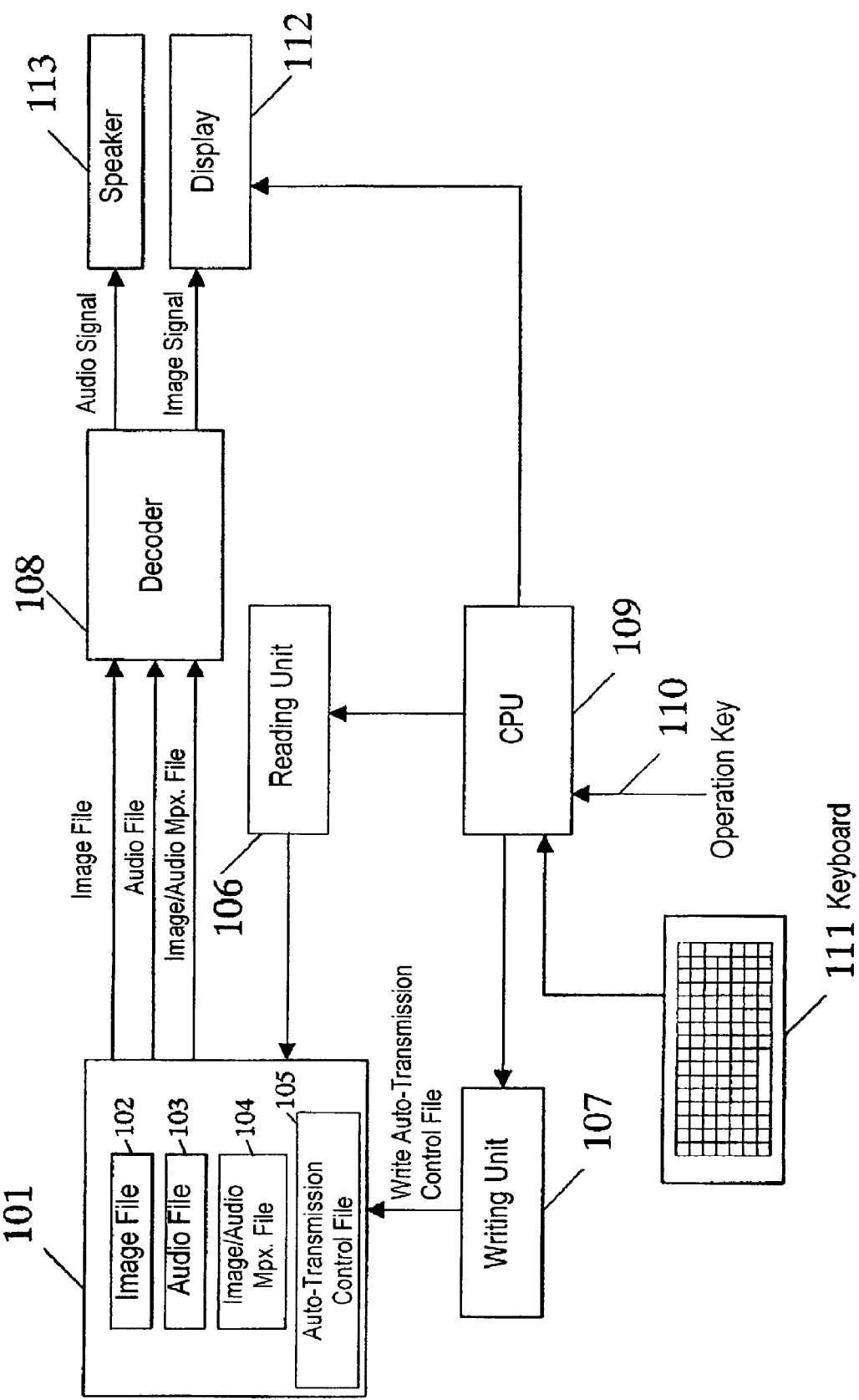
FIG. 1 is a block diagram of a device for generating an automatic transmission control file for controlling file transmission in an automatic file transmission system of embodiments 1 to 4 of the invention.

Referring to the drawings, preferred embodiments of the invention will be described below.

Embodiment 1

FIG. 1 is a block diagram of a device for generating an automatic transmission control file for controlling file transmission in an automatic file transmission system of embodiment 1 of the invention. In FIG. 1, a memory 101 stores image and audio digital data acquired (coded) with a device such as digital still camera, digital video camera or scanner. The memory 101, for example, like a flash memory card, is detachable. The memory may be a detachable memory such as an ultra-small hard disk, optical disk, or memory supported by battery. An image file 102 is a file of image data stored in the memory 101, an audio file 103 is a file of audio data, and an image/audio multiplex file 104 is a file of image data and audio data multiplexed and stored in one file. An automatic transmission control file 105 is a file storing information showing a destination address and sender address for automatic transmission of the image file 102, audio file 103, and image/audio multiplex file 104. FIG. 1, for simplicity, shows one file each for the image file 102, audio file 103, image/audio multiplex file 104, and automatic transmission control file 105. But the number of the files are not limited to this example, actually, may be plural for each. All of the image file 102, audio file 103, and image/audio multiplex file 104 may not be stored in the memory 101. For example, the image file 102 may not be stored in the memory 101.

A reading unit 106 reads each file stored in the memory 101, and a writing unit 107 writes the automatic transmission control file 105 into the memory 101. A decoder 108 decodes and reproduces the image file 102, audio file 103, and image/audio multiplex file 104 read from the memory 101. A central processing unit (CPU) 109 generates or edits the automatic transmission control file 105 depending on an input from an operation key 110 and keyboard 111, controls the reading unit 106 for reading an image file and others, and controls display of menu screen in a display 112.

The display 112 such as liquid crystal display device or cathode-ray tube displays an image signal decoded by the decoder 108, and a speaker 113 reproduces an audio signal decoded by the decoder 108.

Figure 2:
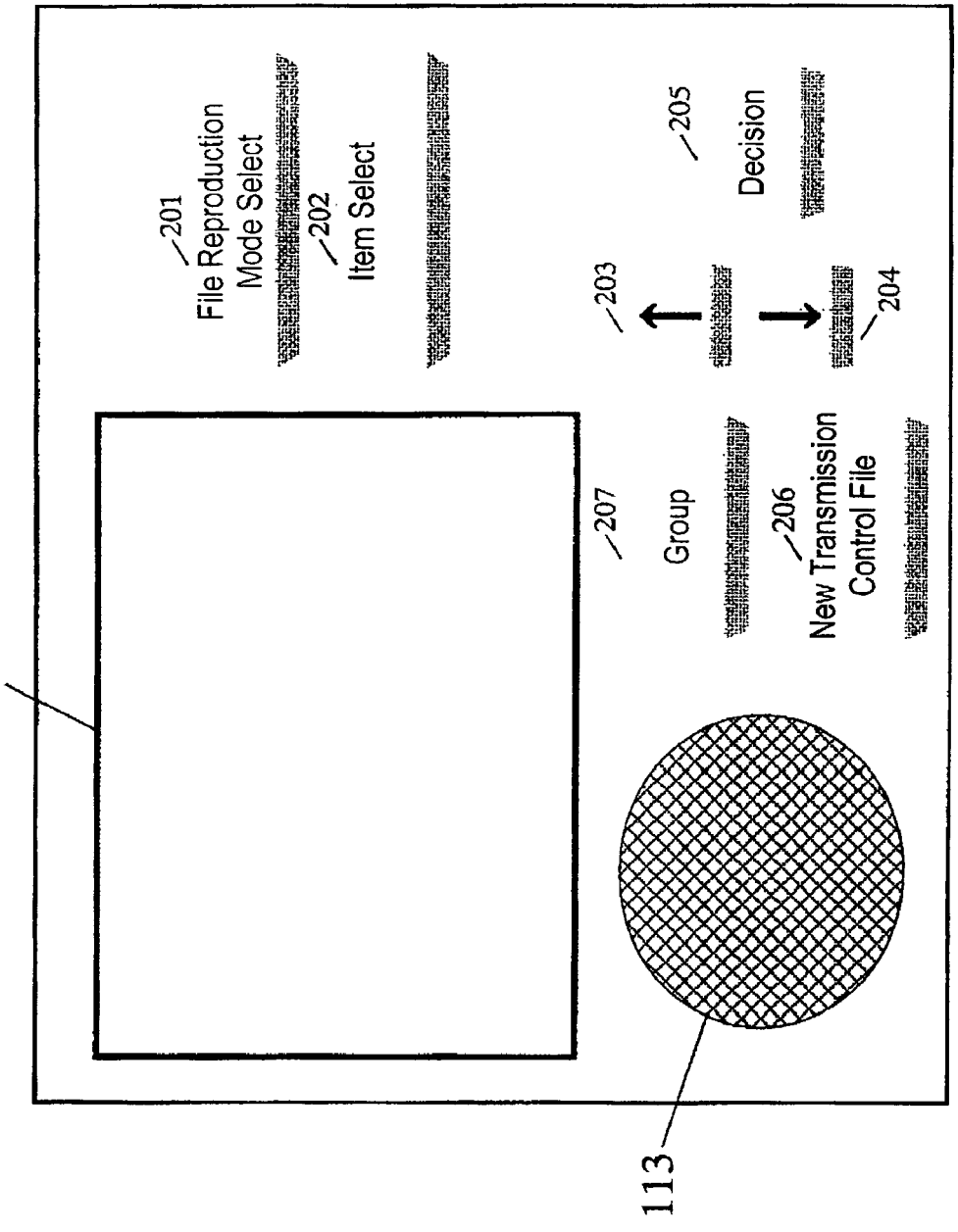
FIG. 2 is a layout diagram of an operation panel of the device for generating the automatic transmission control file for controlling file transmission of embodiments 1 to 4.

FIG. 2 is a layout diagram of an operation panel of the device for generating the automatic transmission control file 105 for controlling file transmission in the automatic file transmission system of the embodiment.

In FIG. 2, keys 201 to 207 compose the operation key 110 shown in FIG. 1. Each key input signal is sent to the CPU 109 shown in FIG. 1. Principal functions will be described as follows. In FIG. 2, reference numeral 112 and 113 denote the display and the speaker, respectively.

When a file reproduction mode select key 201 is pressed, the device is set to a reproduction mode of files in the memory 101, and the CPU 109 controls the reading 106 to read one of files stored in the memory 101. The file is reproduced by the decoder 108. An image of the reproduced file is displayed in the display 112, and a sound of the reproduced file can be output from the speaker 113. If an object of reproduction is an image file, only an image is reproduced, or in the case of audio file, only a sound is reproduced. In the case of image/audio multiplex file, both an image and sound are reproduced.

When a specified item select key 202 is pressed, the device is set to a mode for selecting an item to be included in the automatic transmission control file 105.

A send key 203 and a return key 204 are for searching for a file to be reproduced or for selecting an item from a menu on the display 112. A decision key 205 is for determining a content selected with the send key 203 or return key 204, or determining a content entered by the keyboard 111.

When a new transmission control file generate key 206 is pressed, the CPU 109 controls the writing unit 107 to generate an automatic transmission control file 105 in the memory 101 as a new transmission information file.

When a group key 207 is pressed, the CPU 109 provides a specific information group with a group ID number, and writes information for transmission together with a specific character string in the automatic transmission control file.

Figure 3:
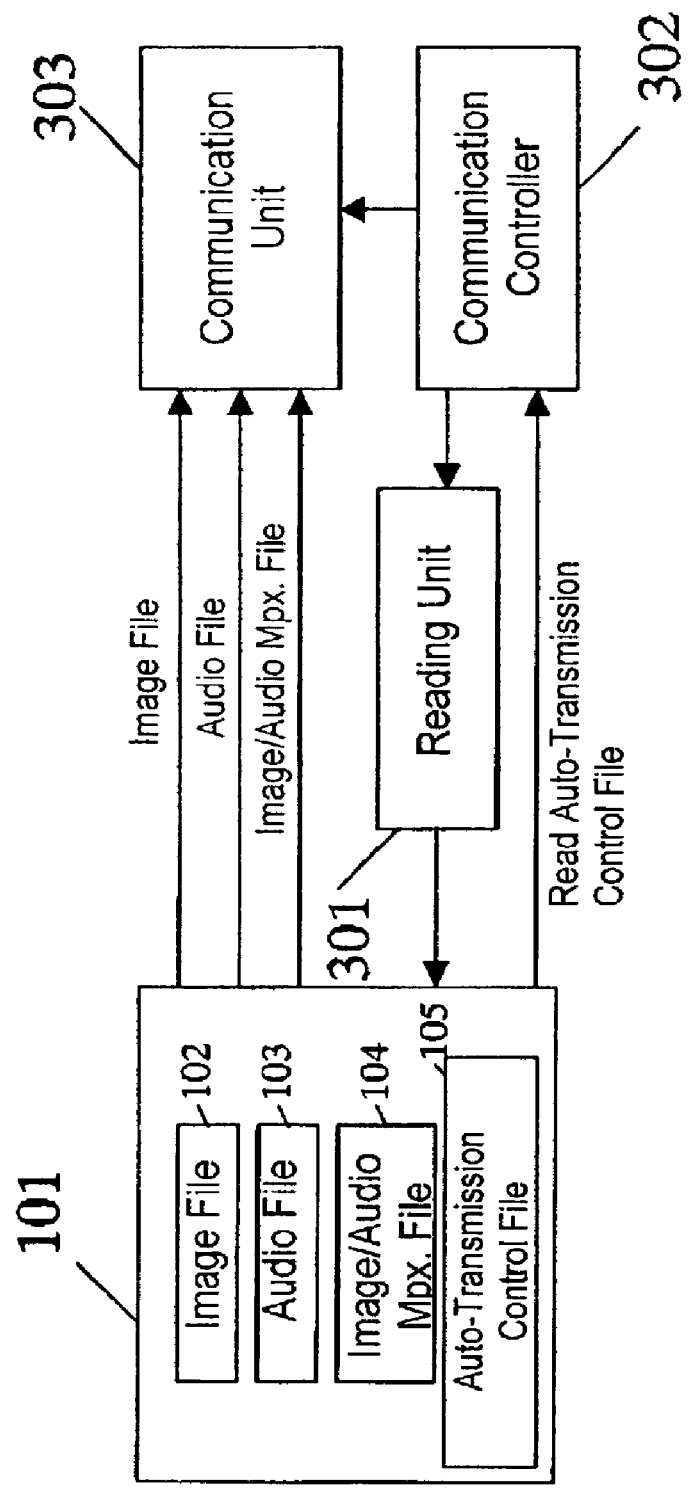
FIG. 3 is a block diagram of the device for transmitting file according to automatic transmission control file in the automatic file transmission system of embodiments 1 and 2.

FIG. 3 is a block diagram of the device for transmitting a file according to the automatic transmission control file 105 in the automatic file transmission system of the embodiment. In FIG. 3, the memory 101, image file 102, audio file 103, image/audio multiplex file 104, and automatic transmission control file 105 are the same as those shown in FIG. 1. A reading unit 301 reads the image file 102, audio file 103, image/audio multiplex file 104, and automatic transmission control file 105 from the memory 101. A communication controller 302 controls reading of a file to be transmitted from the memory 101 according to a description in the automatic transmission control file 105, and controls transmitting of a file in a communication unit 303. The communication unit 303 transmits the file read from the memory 101 by the reading unit 301.

Figure 4:
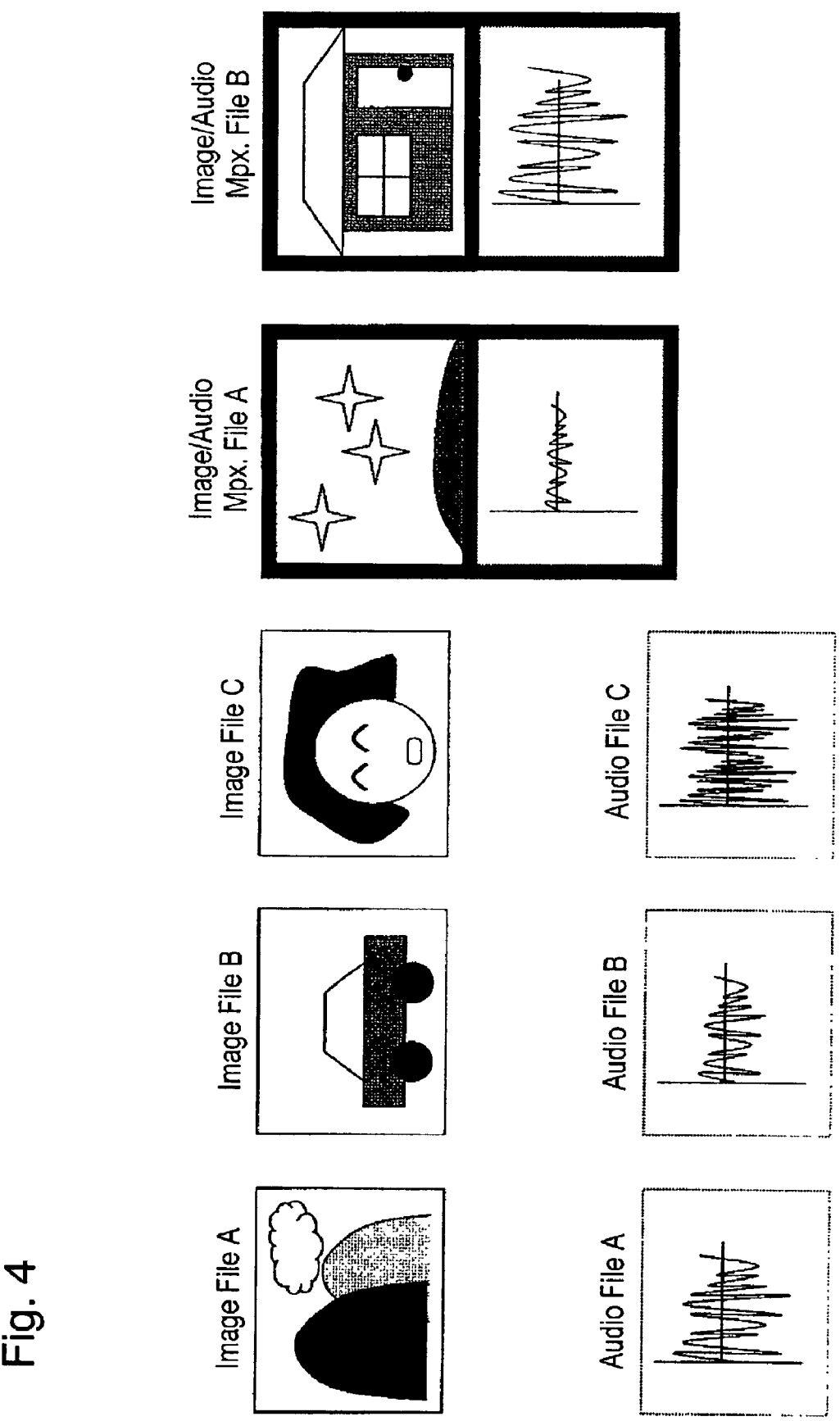
FIG. 4 is a schematic diagram showing an image file, an audio file, and an image/audio multiplex file stored in memory of embodiments 1 to 5.

FIG. 4 is a schematic diagram showing the image file, audio file, and image/audio multiplex file stored in the memory 101. In FIG. 4, image files A, B, C include image data. Audio files A, B, C include audio data. Image/audio multiplexed files A, B include multiplexed image and audio data. In the following explanation, eight data files shown in FIG. 4 are stored in the memory 101. A data file stored in the memory 101 is not limited to the image files, audio files, and image/audio multiplex files shown in FIG. 4, but may be, for example, a text file, hyper text markup language (HTML) format file, or executable program.

An operation of the device of embodiment 1 of the invention having such configuration will be explained below.

If a user selects a desired file from the image file 102, audio file 103, and image/audio multiplex file 104 stored in the memory 101, and if the user specifies a destination, the device for generating an automatic control file for controlling file transmission in FIG. 1. generates the automatic transmission control file 105 through the following procedure.

At this moment, the user desires to transmit image file B of the eight files shown in FIG. 4.

At first, the user presses the new transmission control file generate key 206. By this key input, an automatic transmission control file is newly started to edit, and the CPU 109 controls the writing unit 107 to generate a file with a file name of, for example, "AUTSEND1" in the memory 101.

Then, the user presses the file reproduction mode select key 201 to select a file to be transmitted automatically, and a file in the memory 101 is reproduced in the display 112 or speaker 113. At this time, for example, the image file A is reproduced at first, and the send key 203, upon being pressed, allows a reproduction file to change. Then, the image file B, image file C, image/audio multiplex file A, image/audio multiplex file B, audio file A, audio file B, and audio file C are reproduced sequentially. Upon desiring to transmit the image file B, the user presses the send key 203 or return key 204, and reproduces the image file B to be transmitted, and then presses the decision key 205. The CPU 109 has a temporary memory for storing information temporarily inside. When the decision key 205 is pressed, the temporary memory stores the file name of the image file B after a character string "SEND_SRC=" for indicating that the user selects the file to be transmitted in the file reproduction mode.

Figure 5:
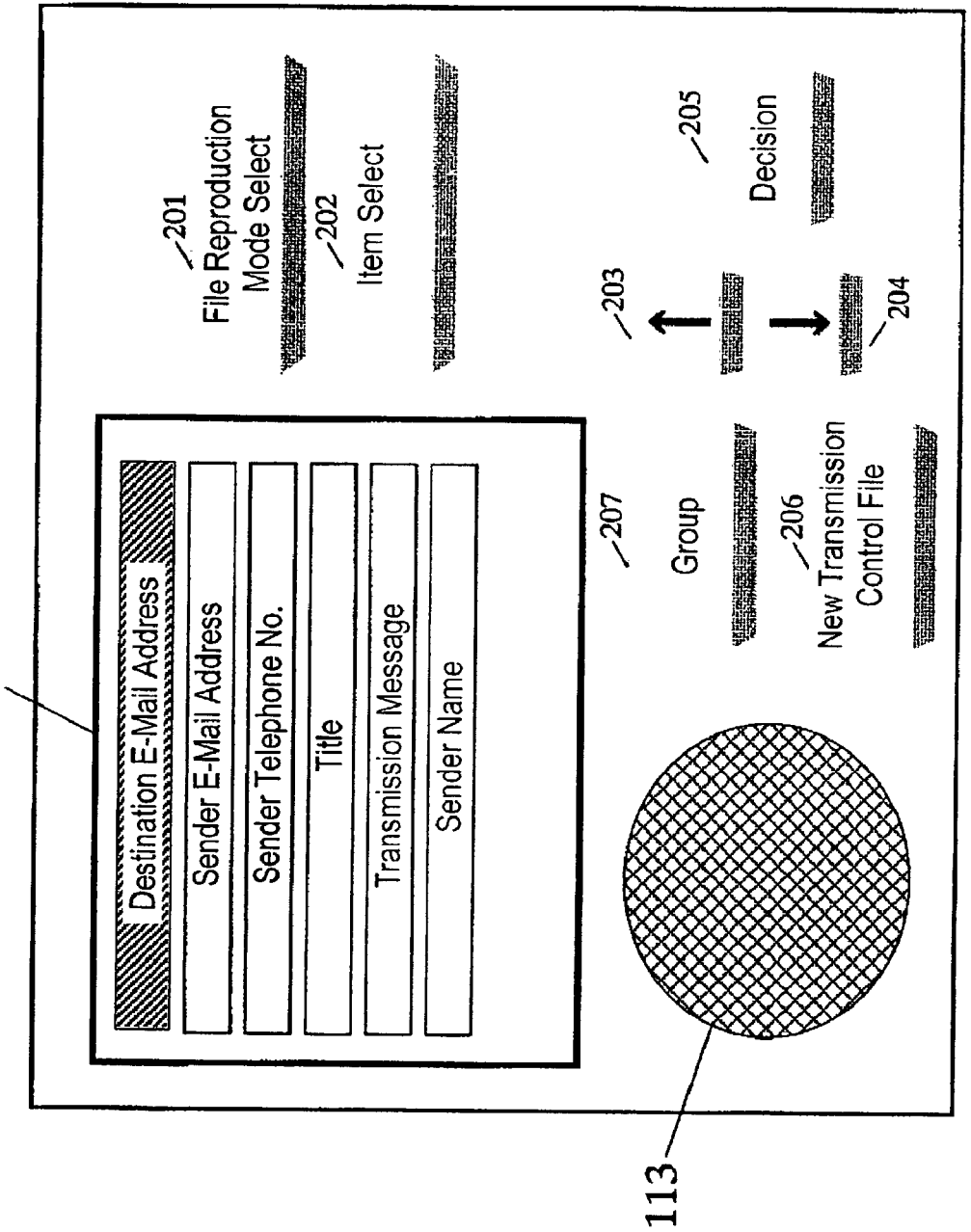
FIG. 5 is a diagram for explaining menu screen display of the device for generating automatic transmission control file for controlling file transmission of embodiments 1 and 2.

Consequently, to enter information for file transmission such as a destination, the user presses the specified item select key 202. When the specified item select key 202 is pressed, as shown in FIG. 5, the display 12 displays a menu including six items, that is, a destination electronic mail address, sender electronic mail address, sender telephone number, title, transmission message, and sender name. The menu is for entering information for transmission, and items on the screen can be selected through pressing the send key 203 or return key 204. For example, in FIG. 5, a selected item is highlighted. That is, FIG. 5 shows that the destination electronic mail address is selected at this moment.

Figure 6:
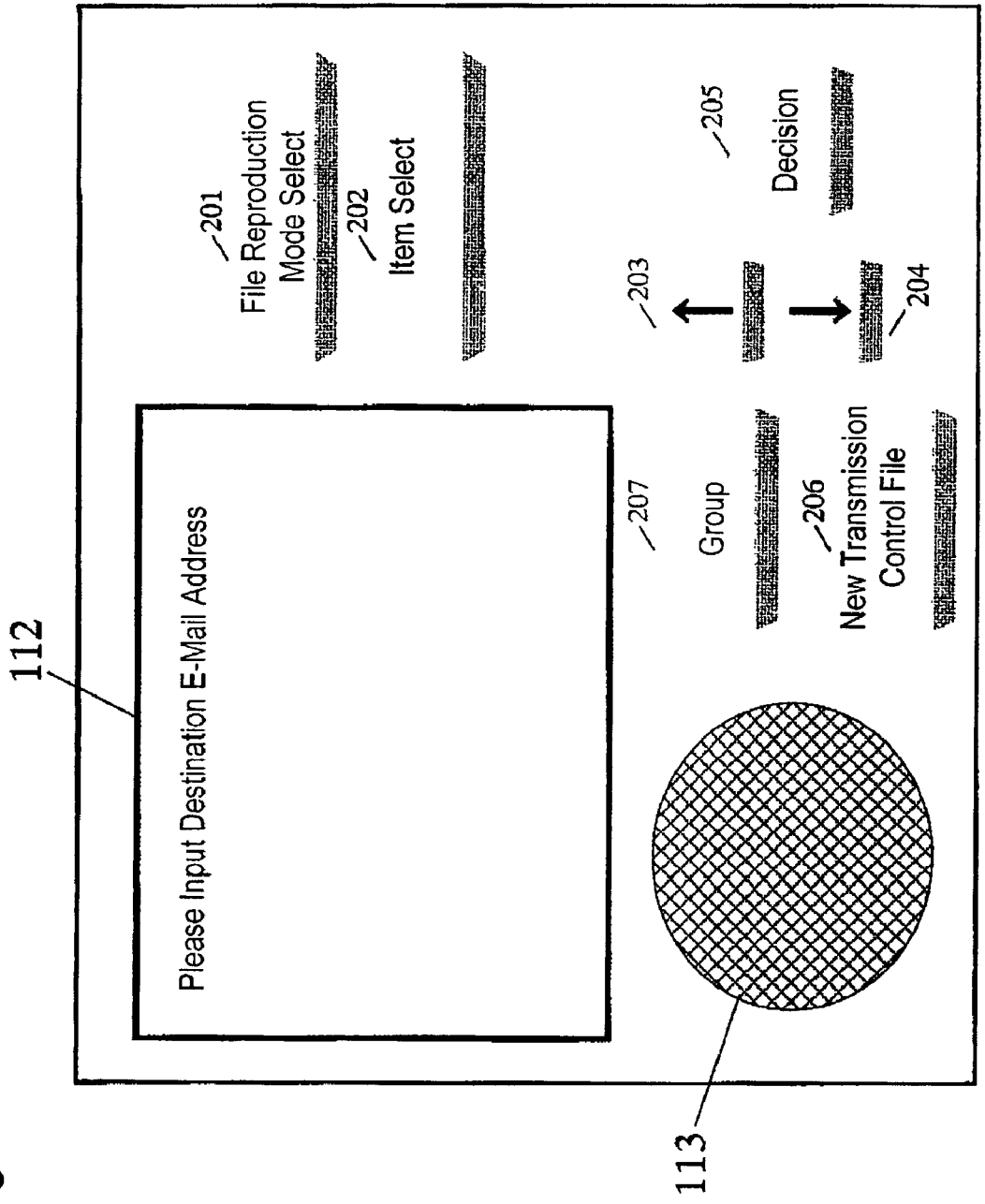
FIG. 6 is a diagram for explaining menu screen display of the device for generating automatic transmission control file for controlling file transmission of embodiments 1 and 2.

Thus, when entering a specific item, the user selects the item through the display 112 with the send key 203 or return key 204. Then, the selected item is highlighted as shown in FIG. 5, and the decision key 205 is pressed. Then, the display 112 shows a screen instructing the user to enter the destination electronic mail address as shown in FIG. 6. When the user operates the keyboard 111 to enter the destination electronic mail address, for example, "AAA@BBB.ne.jp", the address is shown on the display 112. Then, if the address is correct, the decision key 205 is pressed to terminate to input the electronic mail address, and the screen returns to the menu shown in FIG. 5. At this moment, when the decision key 205 is pressed, the entered electronic mail address is stored in the temporary memory in the CPU 109 after a character string "SENT)_ADR=" showing the destination electronic mail address.

Other items such as the sender electronic mail address, sender telephone number, title, transmission message, and sender name is input similarly. The item, upon being selected, is input through the keyboard 111, and the decision key 205 is pressed. At this moment, the input information is stored in the temporary memory of the CPU 109 together with a character string showing a category of the information. The character string showing the category of the information may be, for example, "USR_ADR" for the sender electronic mail address, "USR_TEL" for the sender telephone number, "SEND_TTL" for the title, "SEND_MSG" for transmission message, and "USR_NAM" for the sender name.

An item, of the six items, which is not particularly necessary for the user may not be input. At least one item specifying the destination must be input. For example, if a message is not attached to the transmission, the message may not be input. In embodiment 1 of the invention, all items are input, the following information is stored in the temporary memory of the CPU 109.

SEND_SRC=(file name of image file B)
SEND_ADR="AAA@BBB.ne.jp"
USR_ADR="CCC@DDD.com"
USR_TEL="8166YYYYYYY"
SEND_TTL="Hello"
SEND_MSG="Good Morning!"
USR_NAM="TARO NIPPON"

The character strings enclosed with double quotation marks (") indicate character codes such as ASCII codes.

After input of all necessary items for transmission, when the group key 207 is pressed, the CPU 109 recognizes the file name of the selected image file B, and the information of necessary items for transmission as one group. Then, the CPU109 provides the group with a unique group ID number (for example, "001"), and controls the writing unit 107 to write the group ID number and the data stored in the temporary memory of the CPU 109 in sequence into the automatic transmission control file "AUTSEND1" in the memory 101.

FIG. 7 shows a content of the automatic transmission control file "AUTSEND1". In FIG. 7, "GID" indicates the group ID number, for example, "001". Character strings like "SEND_SRC" indicate a file name of a file to be transmitted and information about items for transmission. Thus, in the automatic transmission control file 105, all information necessary for file transmission is included.

The procedure for generating the automatic transmission control file 105 has been described in above. Then, file transmission according to the automatic transmission control file 105 shown in FIG. 7 will be explained.

The user connects the memory 101 storing the automatic transmission control file 105 and various files including image and sound data to the device for transmitting the file according to the automatic transmission control file shown in FIG. 3. More specifically, the memory 101 is removed from the device in FIG. 1, and inserted into the device in FIG. 3. As a result, the reading unit 301 automatically reads the automatic transmission control file 105, which is then sent to the communication controller 302. The communication controller 302 acquires the automatic transmission control file 105, searches for the string "GID" from the first line of the automatic transmission control file, and recognizes the line of the first string "GID" to the line before next string "GID" as a single group. The final group in the automatic transmission control file 105 is from the line of the final string "GID" to the final line of the file. In this embodiment 1, the file includes only one group, that is, from the line of the first string "GID" to the final line of the automatic transmission control file 105.

The automatic transmission control file 105 contains the file name of the file to be transmitted and information for transmission, for example, the destination electronic mail address together with specific character strings. Upon recognizing the content in the automatic transmission control file 105 from the specific character strings, the communication controller 302 controls the communication unit 303 to transmits the file. Specifically, in the automatic transmission control file shown in FIG. 7, all items of the file name of the file to be transmitted, destination electronic mail address, sender electronic mail address, sender telephone number, title, transmission message, and sender name are included. The image file B as the file to be transmitted is read from the memory 101 by the reading unit 301. And the file B is sent to the destination electronic mail address as the file attached to an electronic mail. At this moment, the sender electronic mail address, sender telephone number, title, transmission message, and sender name written in the automatic transmission control file 105 are also included in the electronic mail to be transmitted. Specifically, the title of the electronic mail to be transmitted is indicated by the character string "SEND_TTL" in the automatic transmission control file, and the character string following to the string "SEND_MSG" is included as a text of the electronic mail. Information of the sender is also included in the electronic mail. Thus prepared electronic mail is transmitted from the communication unit 303.

Figure 8:
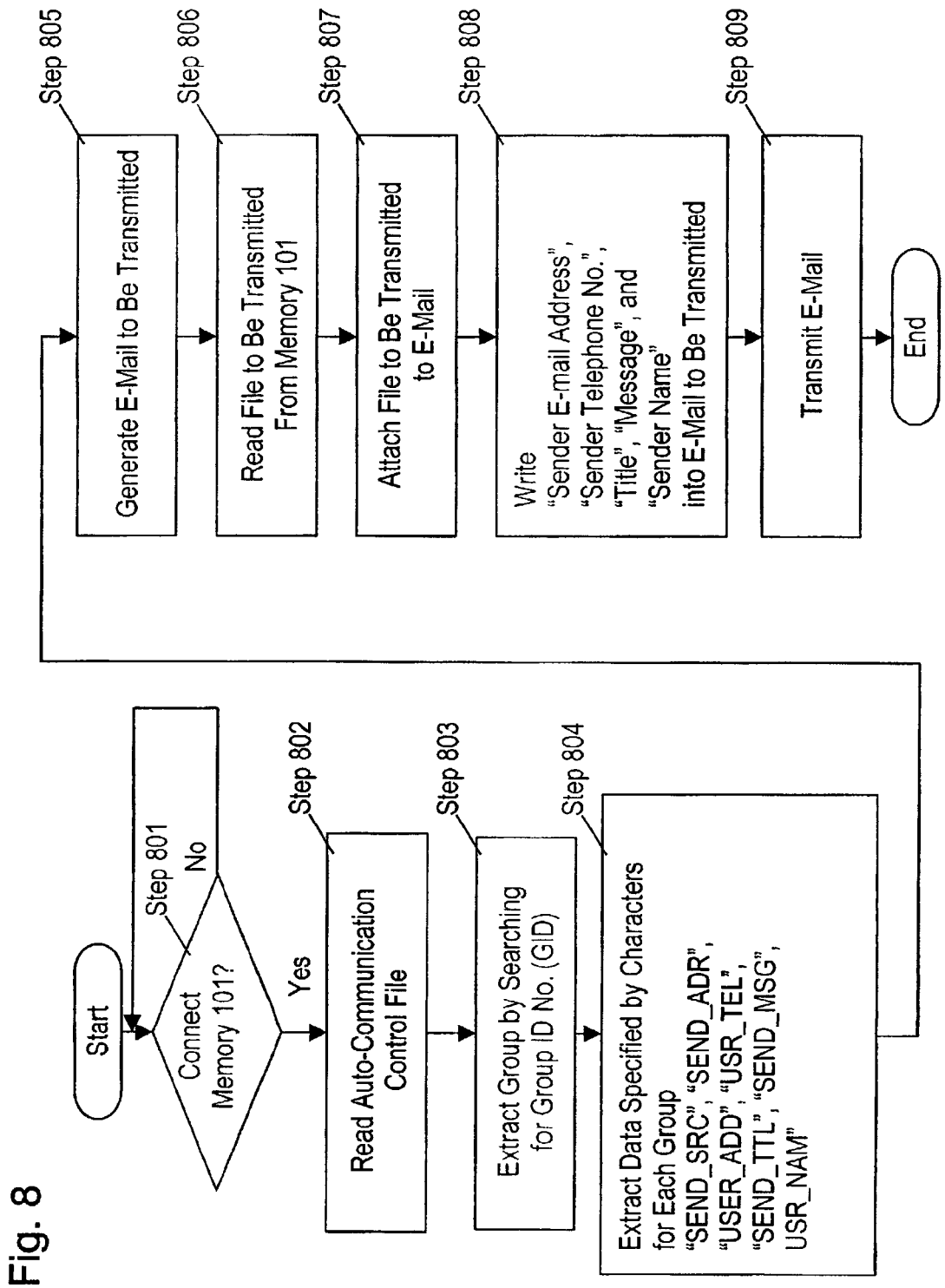
FIG. 8 is a flowchart of automatic transmission operation of embodiments 1 and 2.

The operation for file transmission is shown in a flowchart in FIG. 8. In FIG. 8, at step 801, it is detected whether the memory 101 is connected or not, and if the memory 101 is connected, the process goes to next step. At step 802, the reading unit 301 reads the automatic transmission control file 105 in the memory 101 automatically, and sends the file to the communication controller 302. At step 803, the communication controller 302 searches for the group ID number in the automatic transmission control file, and detects a series of information in a group. At step 804, the information in the group is extracted and acquired. At step 805, the communication controller 302 generates an electronic mail to be transmitted in the communication unit 303, and specifies a destination of the electronic mail to an address specified by a strong "SEND_ADR" in the automatic transmission control file. At step 806, the controller controls the reading unit 301 to read the image file B from the memory 101 as the file to be transmitted, and attaches the image file B to the electronic mail generated in the communication unit 303 at step 807. At step 808, the sender electronic mail address, sender telephone number, title, transmission message, and sender name acquired from the automatic transmission control file are written in the electronic mail. Finally, at step 809, transmission of the electronic mail is instructed to the communication unit 303, and the electronic mail with the attached image file B is transmitted.

Thus, according to embodiment 1 of the invention, the information about the file to be transmitted automatically is stored in a group format in the automatic transmission control file as shown in FIG. 7. Only by connecting the memory storing the data file and automatic transmission control file to the communication unit, a desired file can be automatically transmitted to a desired destination according to the automatic transmission control file. At this moment, the sender electronic mail address, sender telephone number, title, transmission message, and sender name can be also written in the electronic mail to be transmitted.

In embodiment 1 of the invention, sending one file has been shown, but that is not limited to one file. Plural files can be selected and transmitted through pressing the file reproduction mode select key 201. For example, for transmit the audio file A together with the image file B, after pressing the decision key 205 reproducing the image file B and selecting image file B as explained above, the user may press the send key 203 or return key 204 again to reproduce the audio file A, and press the decision key 205. As a result, a file name of the audio file A is stored following to the character string "SEND_SRC=" in the temporary memory of the CPU 109. Then, in the same manner as explained above, if the specified item select key 202 is pressed, and if information for file transmission is input, an automatic transmission control file is generated. FIG. 9 shows an automatic transmission control file prepared in such manner. As shown in FIG. 9, two file names of the image file B and audio file A to be transmitted are specified by the character string "SEND_SRC".

Then, file transmission will be explained. Similarly to the file transmission explained in above, when the memory 101 is connected to the device for transmitting the file according to the automatic transmission control file shown in FIG. 3, the reading unit 301 automatically reads the automatic transmission control file 105. Then, the file is sent to the communication controller 302. The communication controller 302 acquires the automatic transmission control file, and searches for the string "GID" from the first line of the automatic transmission control file 105, and recognizes, as one group, contents from the line of the first string "GID" to the line before the next string "GID". This automatic transmission control file specifies two file names as the files to be transmitted. Therefore, the communication controller 302 controls the reading unit 301 to read the image file B and audio file A from the memory 101 as the files to be transmitted, and attaches the image file B and audio file A to the electronic mail generated in the communication unit 303. The electronic mail with these two attached files is transmitted from the communication unit 303.

Thus, according to embodiment 1 of the invention, plural files can be also transmitted automatically.

In embodiment 1 of the invention, the communication unit 303 may be either a wired transmitter or wireless transmitter. The wired transmission, for example, may transmit the file via a fixed telephone line through a modem. The wireless transmission may transmit the file with a mobile phone or other mobile communication device.

In embodiment 1 of the invention, the information to be written on the automatic transmission control file 105 includes the file name of the file to be transmitted, destination electronic mail address, sender electronic mail address, sender telephone number, title, transmission message, and sender name. But they are not limited to them, and other information may be also written, such as a sender's address, date of transmission, transmission time, and date and time when the automatic transmission control file 105 is stored last time.

In embodiment 1 of the invention, when transmitting a text file, the device may write contents of the text file in an electronic mail instead of attaching the text file to the electronic mail, and transmit the mail. In this case, the receiver of the electronic mail can read the contents of the transmitted file in the text of the mail without checking an attached file.

In embodiment 1 of the invention, the memory 101 is detachable, but not limited to this. For example, the memory 101 may be a fixed memory in the device. When a file is transmitted, a data file and an automatic transmission control file may be duplicated in other detachable memory.

A device, upon integrally including a unit for generating an automatic transmission control file for controlling transmission and a unit for transmitting the file according to the automatic transmission control file, may be switch the memory 101 for both units instead of employing the memory 101 being detached and connected.

In embodiment 1 of the invention, the file is transmitted as a file attached to an electronic mail, but this is not limitative. A transmission method by the communication unit 303 is not limited to transmission in electronic mail format, and the same effects of the invention are obtained also in any other modulation method or protocol for sending data by the communication unit 303.

Embodiment 2

In embodiment 1 of the invention, a device for generating an automatic transmission control file and for transmitting a desired file to one destination has been explained. Herein, a device transmitting a desired file to plural destinations with an automatic transmission control file will be explained.

For example, similarly to embodiment 1 of the invention, an image file B is sent to a certain destination, and an audio file B is sent to other destination.

At first, a user presses a new transmission control file generate key 206 to start editing an automatic transmission control file, and presses a group key 207 to store all information about transmission of the image file B in the automatic transmission control file. The procedure is the same as in embodiment 1 of the invention, and hence, the explanation is omitted.

The procedure after pressing a group key 207 for storing all information about transmission of the image file B in the automatic transmission control file is as follows.

Similarly to selecting of the image file B, a user presses a file reproduction mode select key 201, presses a send key 203 or return key 204 to reproduce the audio file B to be transmitted, and the presses the decision key 205. Then, the CPU 109 stores a file name of the audio file B into a temporary memory of the CPU after a character string "SEND_SRC=", which indicates that the user has selected this file as the file to be transmitted in the file reproduction mode.

To input information for file transmission such as a destination, the specified item select key 202 is pressed, and similarly to the image file B, six items are input, that is, a destination electronic mail address, sender electronic mail address, sender telephone number, title, transmission message, and sender name.

The input information is stored in the temporary memory of the CPU 109 together with the same specific character strings as those in embodiment 1 of the invention. All items input for transmitting the audio file B includes the following contents stored in the temporary memory of the CPU 109.

SEND_SRC=(file name of audio file B)
SEND_ADR="EEE@FFF.ne.jp"
USR_ADR="CCC@DDD.com"
USR_TEL="8166YYYYYYY"
SEND_TTL="Bye"
SEND_MSG "Thank You"
USR_NAM="TARO NIPPON"

After all necessary items for transmission are input, when a group key 207 is pressed, the CPU 109 recognizes, as one group, the file name of the selected audio file B, and the information of necessary items for transmission. Then, CPU109 provides the group with a unique group ID number (for example, "002"), and controls the writing unit 107 to write the group ID number "GID=002" and the data stored in the temporary memory of the CPU 109 into the automatic transmission control file 105 in the memory 101 in addition to the information about transmission of image file B.

FIG. 10 shows contents of the automatic transmission control file generated through such operation. In FIG. 10, the string "GID" indicates the group ID number. In FIG. 10, the file includes groups having group ID numbers "001" and "002", respectively. As shown in FIG. 10, the automatic transmission control file contains information about transmission of the image file B and information about transmission of the audio file B in respective groups having different group ID numbers.

A procedure for generating the automatic transmission control file 105 has been explained. Then, file transmission according to the automatic transmission control file 105 shown in FIG. 10 will be explained.

A basic method of file transmission is the same as that in embodiment 1 of the invention, and files are transmitted in two groups included in the automatic transmission control file. That is, for transmitting the image file B based on the information in the group of the group ID number "001", the device reads the image file B to be transmitted from the memory 101. Then, the device attaches the image file B to an electronic mail to be transmitted to an electronic mail address specified by the character string "SEND_ADR", i.e., to an address "AAA@BBB.ne.jp" in FIG. 10. At this moment, information expressed in other character string is also written in the electronic mail and transmitted.

For transmitting the audio file B based on the information in the group of group ID number 002, the device reads the audio file B to be transmitted from the memory 101. Then, the device attaches the audio file B to an electronic mail to be transmitted to an electronic mail address specified by a character string "SEND_ADR", i.e., to an address "EEE@FFF.ne.jp" in FIG. 10. At this moment, information expressed in other character string is also written in this electronic mail and transmitted.

As described above, according to embodiment 2 of the invention, the information about the files to be transmitted is automatically written in plural groups in the automatic transmission control file as shown in FIG. 10. And the desired files can be transmitted to one or more destinations as desired according to the automatic transmission control file. At this moment, further, in the electronic mail to be transmitted, a sender electronic mail address, sender telephone number, title, transmission message, and sender name can be also written and transmitted.

The number of the groups to be written in the automatic transmission control file is not limited to two, but three or more groups can be written in the automatic transmission control file by repeating the same procedure explained above. And image and audio file can be transmitted to three or more destinations.

Moreover, by combining embodiment 2 of the invention with embodiment 1 of the invention, evidently, plural files can be transmitted to plural destinations.

Embodiment 3

In embodiments 1 and 2 of the invention, a desired file is transmitted through being attached to the electronic mail in the communication unit 303. But the information transmitter is not limited to the electronic mail only, and transmitting information as an image by a facsimile device will be explained below according to embodiment 3 of the invention.

In embodiment 3 of the invention, a menu displayed on a display 112 when the specified item select key 202 is pressed for inputting information for file transmission such as a destination in the same devices as in embodiments 1 and 2 of the invention is modified. Further, the device for transmitting a file according to the automatic transmission control file will be explained with referring to an explanatory diagram of the menu in FIG. 11 and a block diagram in FIG. 12(a).

Figure 11:
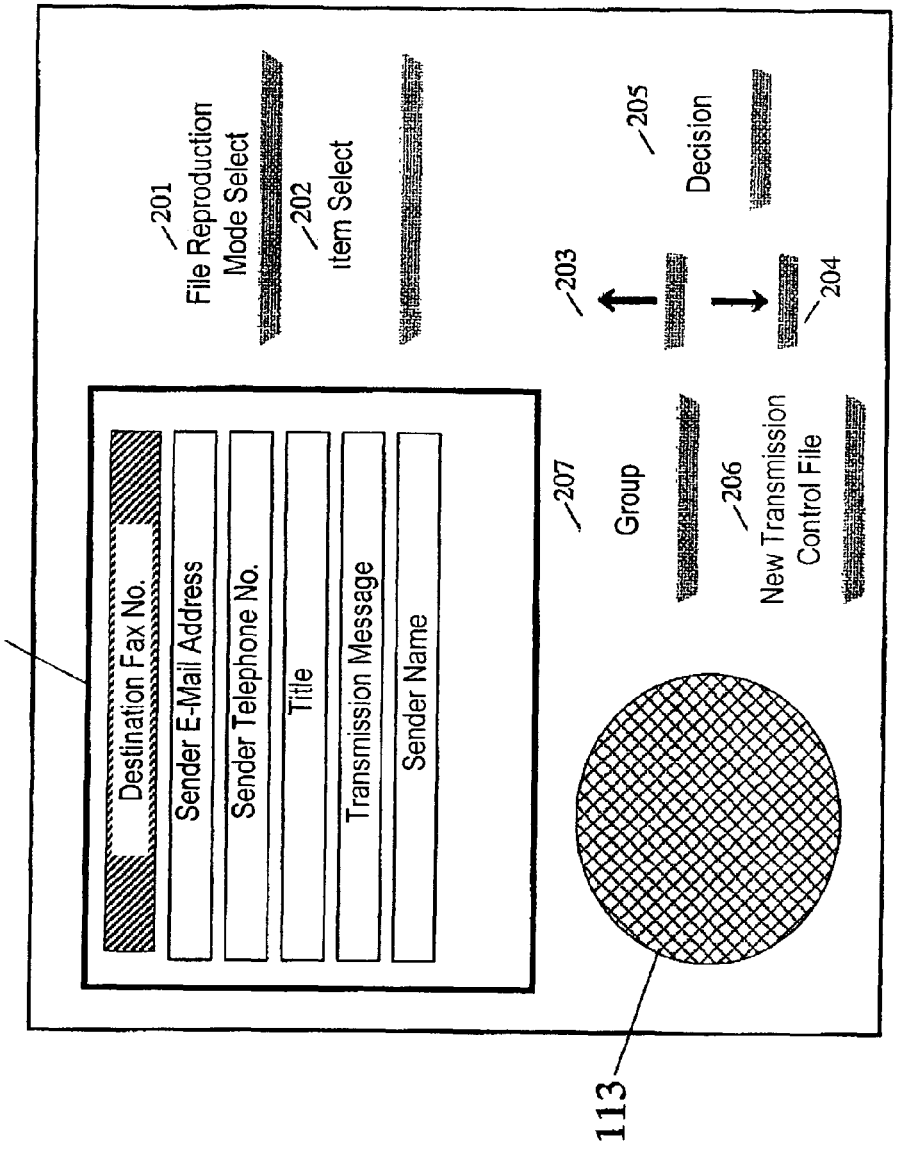
FIG. 11 is a diagram for explaining menu screen display of the device for generating automatic transmission control file for controlling facsimile file transmission of embodiment 3.

FIG. 11 is a diagram of the menu displayed on the display 112 when the specified item select key 202 is pressed for inputting information for file transmission such as a destination. In FIG. 11, the menu includes an item for inputting a destination facsimile number of the destination. Upon selecting the item, a user can input the destination facsimile number through a keyboard 111. The destination facsimile number is written in the automatic transmission control file after a character string "SEND_FAX", in the same operation as in embodiment 1 of the invention. FIG. 13 shows an example of the automatic transmission control file. Other information than the destination facsimile number is the same as in embodiment 1 of the invention. As shown in FIG. 13, the destination facsimile number is specified as "8166XXXXXXX" after the character string "SEND_FAX". The file to be transmitted is now an image file B.

Then, the device for transmitting the file according to the automatic transmission control file will be explained by referring to FIG. 12(a) and FIG. 12(b).

In FIG. 12(a), a memory 101, image file 102, audio file 103, image/audio multiplex file 104, and automatic transmission control file 105 are the same as shown in FIG. 1. A reading unit 1201 reads the image file 102, image/audio multiplex file 104, and automatic transmission control file 105 from the memory 101. A communication controller 1202 controls reading the file to be transmitted from the memory 101 according to a description in the automatic transmission control file 105, and file transmission by a facsimile transmitter 1204. A converter 1203 forms an image by reproducing the file read from the memory 101, and converts the image into a signal conforming to a facsimile transmission standard. The facsimile transmitter 1204 transmits the signal converted by the converter 1203 to a facsimile device.

An operation of the device in FIG. 12(a) will be explained by referring to FIG. 12(b), in which the image file B, i.e., the data file stored in the memory 101, is converted into a signal conforming to a facsimile transmission standard by the converter 1203. Then, the signal is transmitted by the facsimile transmitter 1204, and the receiver can receive an image of the image file B by the facsimile device.

In this configuration, when the memory 101 is connected to the device for transmitting the file according to the automatic transmission control file 105, the reading unit 1201 automatically reads the automatic transmission control file 105, and the file 105 is sent to a communication controller 1202. The communication controller 1202, similarly to the communication controller 302 in embodiment 1 of the invention, acquires the automatic transmission control file, and detects the contents.

The automatic transmission control file 105 contains a file name of the file to be transmitted, and information for transmission such as the destination facsimile number both after specific character strings. In the automatic transmission control file shown in FIG. 13, all of a destination facsimile number, sender electronic mail address, sender telephone number, title, transmission message, and sender name are written. The communication controller 1202 controls the reading unit 1201 to read the image file B as the file to be transmitted from the memory 101. The converter 1203 reproduces the image file, and then, converts the image into a signal conforming to a facsimile transmission standard. The converted signal is sent to the facsimile transmitter 1204. The communication controller 1202 instructs facsimile transmission to the destination facsimile number written in the automatic transmission control file, and the image of image file B is transmitted by facsimile. Simultaneously, the sender electronic mail address, sender telephone number, title, transmission message, and sender name written in the automatic transmission control file 105 may be written with characters in a facsimile message to be transmitted.

Figure 12:
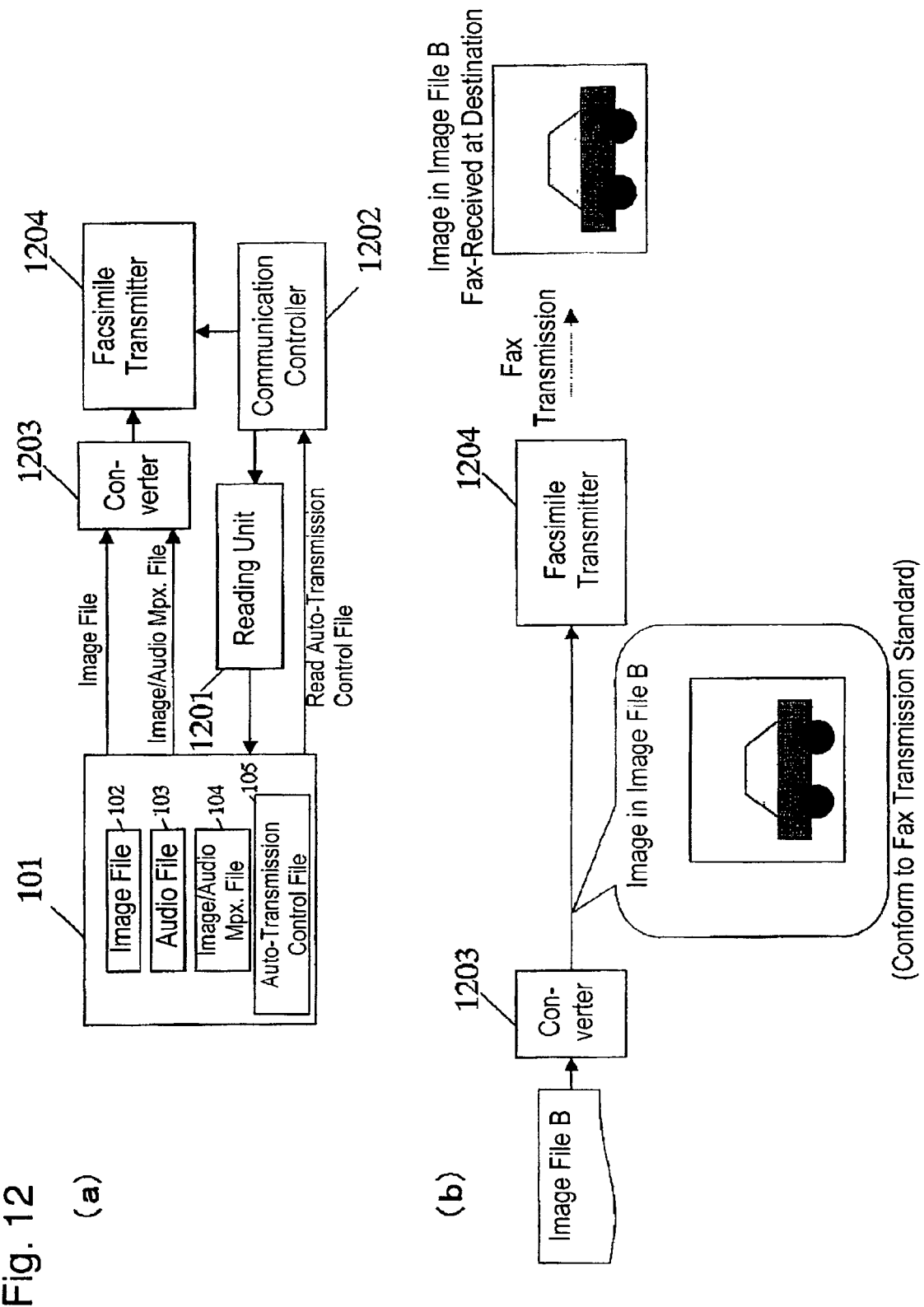
FIG. 12 is a block diagram of the device for facsimile file transmission according to automatic transmission control file in the automatic file transmission system of embodiment 3, and a diagram for explaining transmission of an image file B by facsimile transmission.
Figure 14:
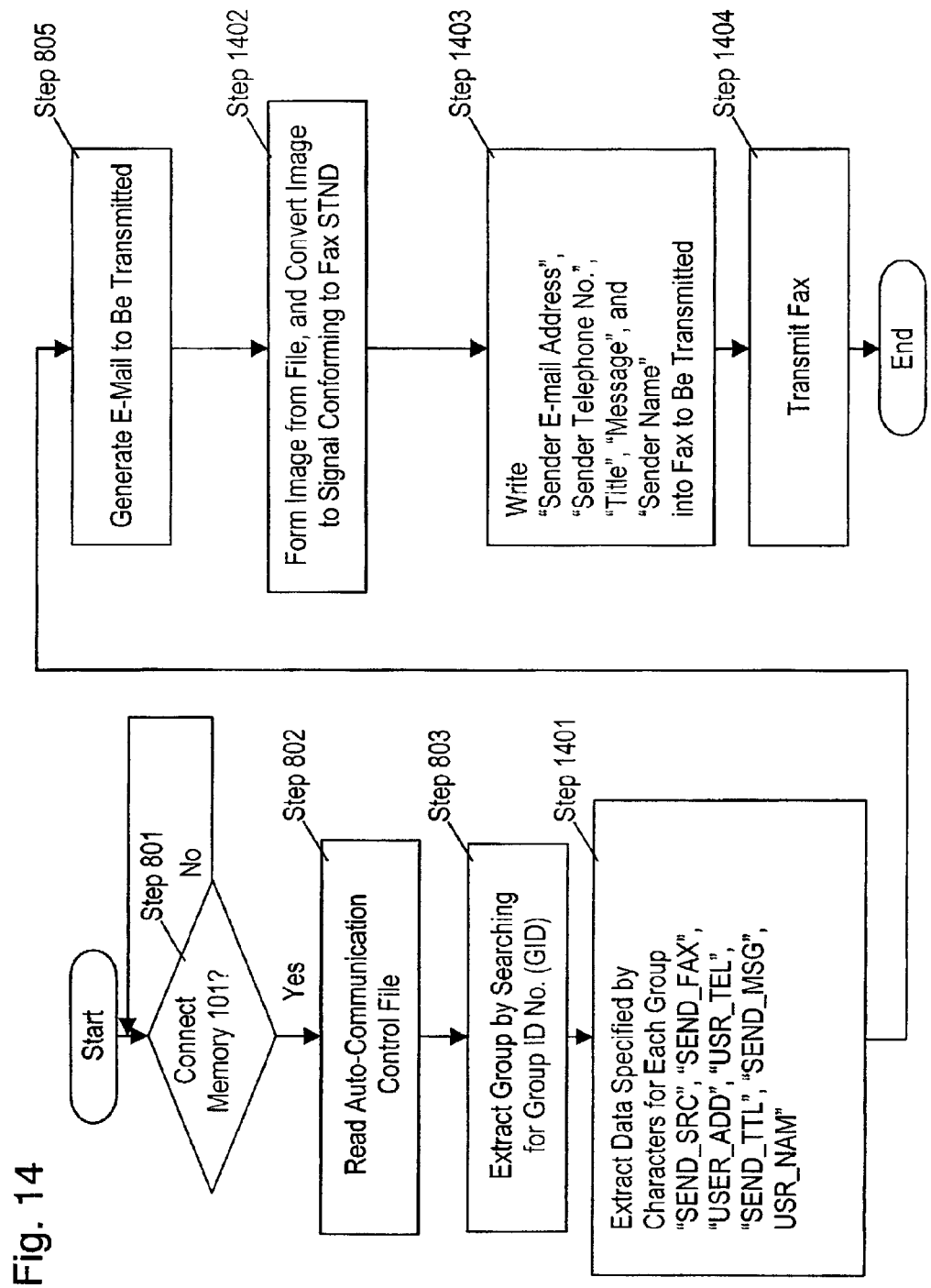
FIG. 14 is a flowchart of automatic transmission operation of embodiment 3.

The operation for file transmission is shown in a flowchart in FIG. 14. In FIG. 14, operations at steps 801 to 803 and 806 are the same as in the flowchart shown in FIG. 8, and the explanation is omitted. At step 1401, information in the group is extracted and acquired from the automatic transmission control file 105. At step 1402, the converter 1203 forms an image is formed from the image file B read from the memory 101, and converts the image into a signal conforming to the facsimile transmission standard. At step 1403, the sender electronic mail address, sender telephone number, title, transmission message, and sender name acquired from the automatic transmission control file are written with characters in a facsimile message to be transmitted. As an example of written characters, the characters may be multiplexed in the signal to be transmitted by facsimile so that the characters may be printed in a part of the facsimile message received at the destination, as shown in FIG. 12(*b*). Finally, at step 1404, the communication unit 1204 is instructed with facsimile transmission to the destination facsimile number written in the automatic transmission control file, so that the image of image file B is transmitted to the destination by facsimile.

Thus, according to embodiment 3 of the invention, writing the destination facsimile number in the automatic transmission control file allows a desired file to be transmitted to a desired destination as a facsimile image.

In embodiment 3, in the case that if a file including multiplexed image and sound such as image/audio multiplex file stored on the memory 101, since the sound cannot be transmitted by facsimile, only the image in the image/audio multiplex file may be transmitted. The sound, however, upon being converted into characters by voice recognition, can be written and transmitted by facsimile. An audio file 103 containing only sound can be transmitted in the same manner.

In embodiment 3, a file to be transmitted, upon being a text file, may be reproduced as alphanumeric characters, or "kana" and "kanji" characters by the converter 1203, and can be transmitted by facsimile. In this case, contents in the text file are printed as characters in the facsimile received at the destination.

Figure 15:
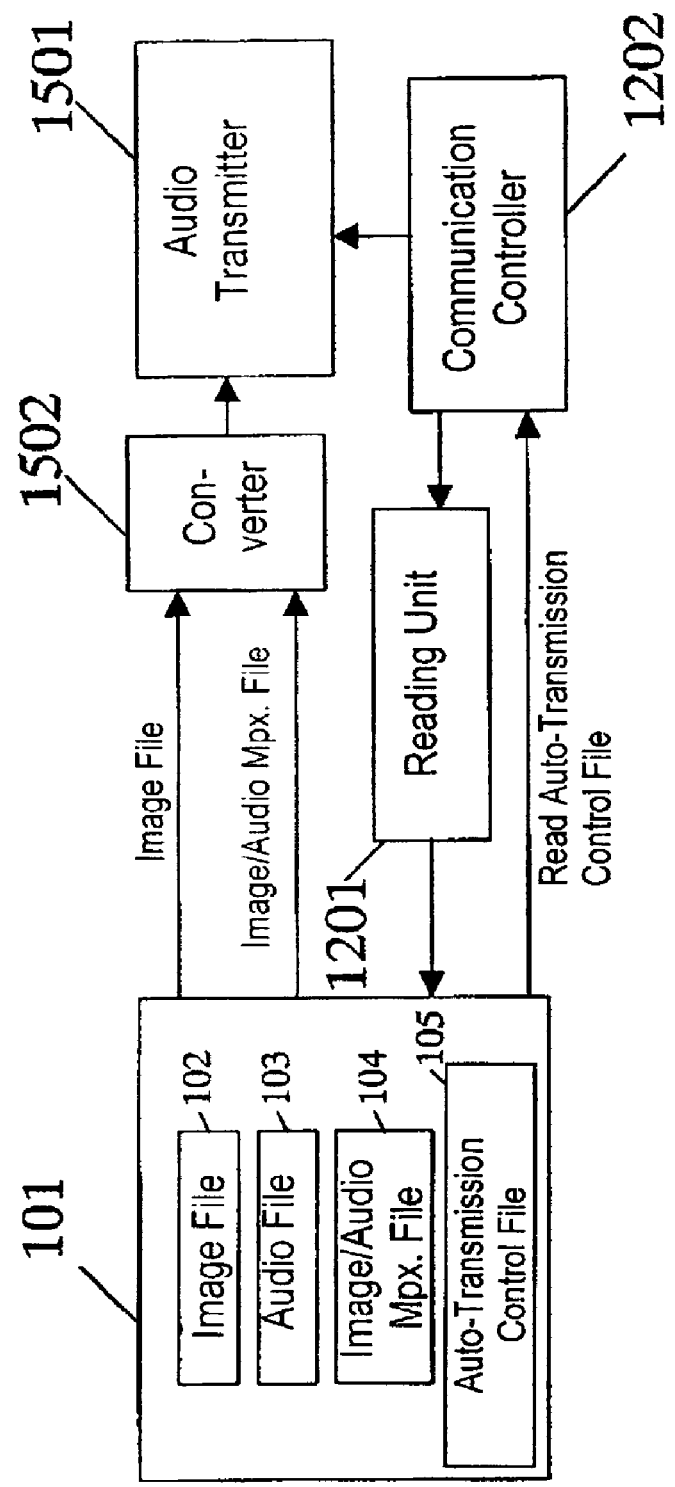
FIG. 15 is a block diagram of the device for audio file transmission according to automatic transmission control file in the automatic file transmission system of embodiment 3.

In embodiment 3, facsimile transmission by facsimile transmitter 1204 is explained. But as shown in FIG. 15, instead of the facsimile transmitter 1204, an audio transmitter 1501 such as mobile phone or fixed telephone may transmit the audio file 103 which is read from the memory 101 and converted into an audio signal conforming to a communication standard of mobile phone or fixed telephone by converter 1502. In this case, as the destination information, a telephone number of the destination must be written in the automatic transmission control file.

Embodiment 4

In foregoing embodiments 1 to 3 of the invention, a desired file is transmitted as a file attached to an electronic mail, as a facsimile image, or as a voice by mobile phone or the like. Automatic move of a desired file to a desired memory device, for example, a hard disk or magnet-optical disk will be explained below.

Figure 16:
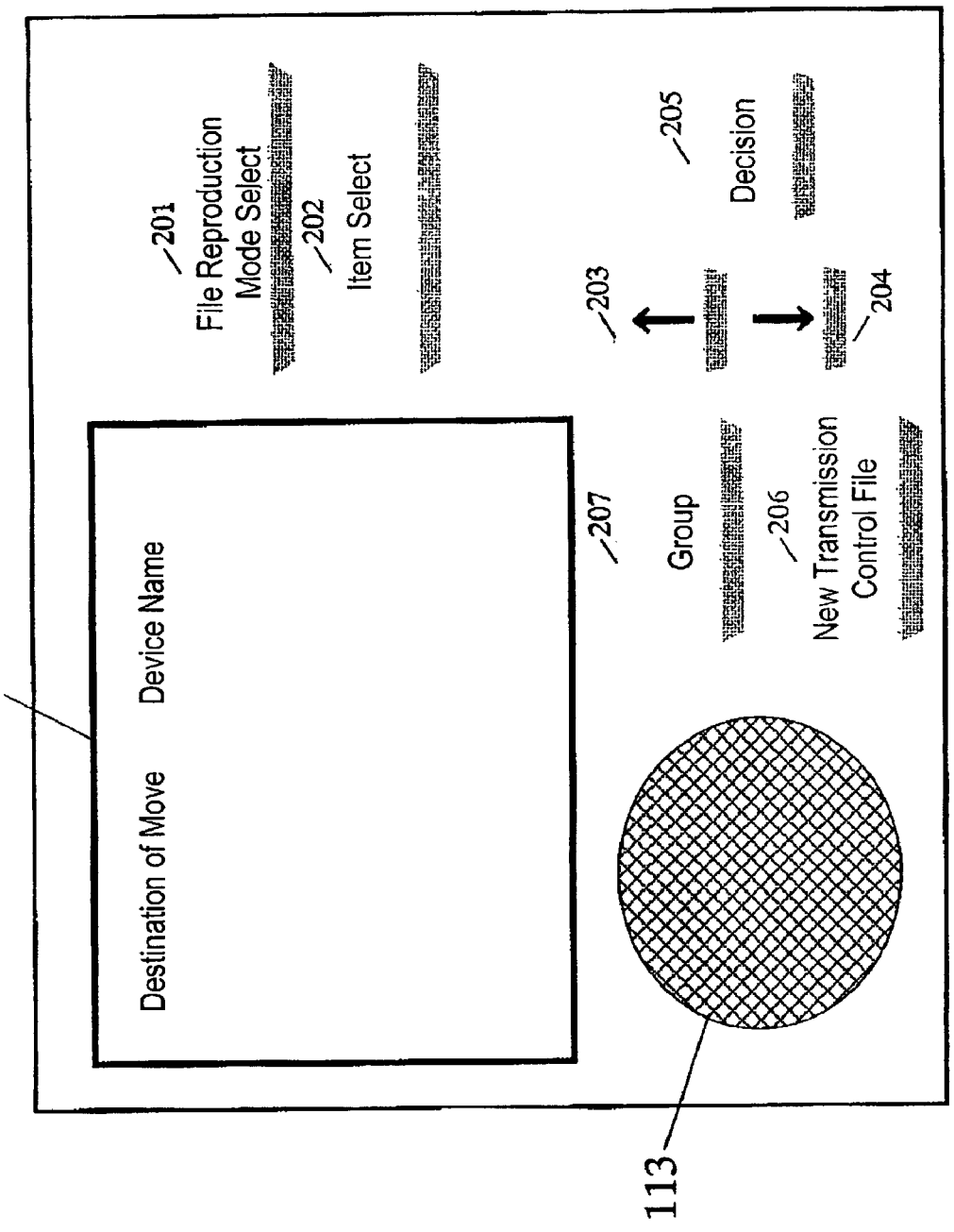
FIG. 16 is a diagram for explaining menu screen display in the device for generating automatic transmission control file for controlling file move of embodiment 4.

In embodiment 4 of the invention, for inputting the information for file transmission such as a destination in the same manner as in embodiments 1 and 2 of the invention, a menu displayed in the display 112 when a specified item select key 202 is pressed is modified as shown in FIG. 16. A device which allows the device at the destination for the move of the file to be input, and which sends the file according to an automatic transmission control file will be explained by referring to a block diagram in FIG. 17. The file to be moved is selected in the same manner as in embodiment 1 of the invention, and the explanation is omitted.

FIG. 16 is a diagram of the menu displayed on the display 112 when the specified item select key 202 is pressed for inputting information for the move of the file such as a destination of the move. In FIG. 16, the menu includes an item for inputting a device at the destination of the move, and by selecting it, a user can input the device at the destination through the keyboard 111. The device at the destination is written after a character string "SEND_DEV" in the automatic transmission file in the same operation as in embodiment 1 of the invention. If being known previously, the device at the destination may be selected on the menu. An example of the automatic transmission control file 105 is shown in FIG. 18. As shown in FIG. 18, the device at the destination is designated as a character string "HDD" indicating a hard disk after the string "SEND_DEV". In embodiment 4 of the invention, differently from embodiment 1 of the invention, only a file name of the file to be moved and the device at the destination are written in the automatic transmission control file 105.

The device for moving the file according to the automatic transmission control file shown in FIG. 18 will be explained.

Figure 17:
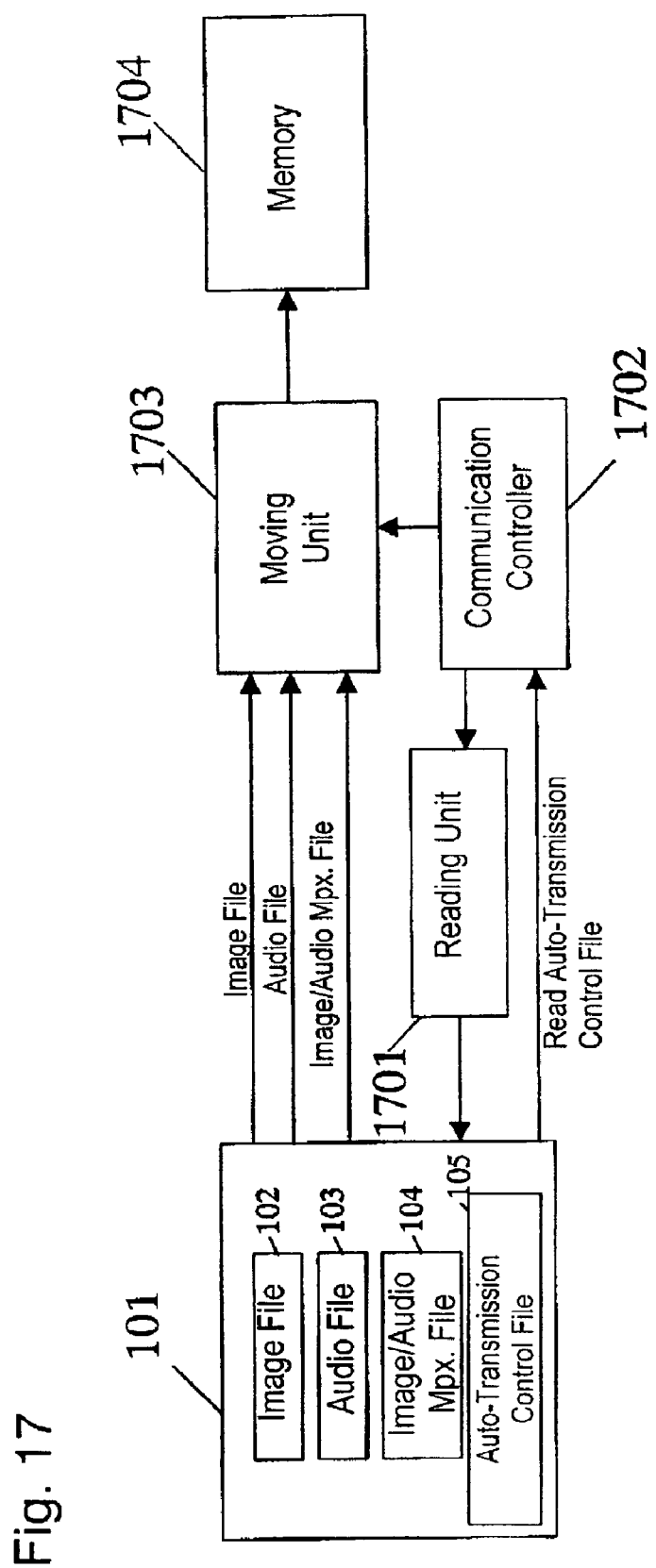
FIG. 17 is a block diagram of the device for moving the file according to automatic transmission control file in the automatic file transmission system of embodiment 4.

In FIG. 17, a memory 101, image file 102, audio file 103, image/audio multiplex file 104, and automatic transmission control file 105 are the same as those shown in FIG. 1. A reading unit 1701 reads the image file 102, audio file 103, image/audio multiplex file 104, and automatic transmission control file 105 from the memory 101. A communication controller 1702 controls reading of the file to be moved from the memory 101 according to a description in the automatic transmission control file 105, and controls move of the file by a moving unit 1703. The moving unit 1703 duplicates the file read out from the memory 101 into, for example, a memory 1704. In embodiment 4 of the invention, the memory 1704 is a hard disk indicated as the string "HDD" in the automatic transmission control file.

In this configuration, when the memory 101 is connected to the device for moving the file according to the automatic transmission control file, the reading unit 1701 automatically reads the automatic transmission control file 105, and send the file 105 to the communication controller 1702. The communication controller 1702, similarly to embodiment 1 of the invention, acquires the automatic transmission control file 105, and detects contents of the file.

The automatic transmission control file contains the file name of the file to be moved and the information of the destination for the move. Specifically, in the automatic transmission control file shown in FIG. 18, the communication controller 1702 controls the reading unit 1701 to read an image file B as the file to be moved from the first memory 101. The file read out is sent to the moving unit 1703. The communication controller 1702 instructs the moving unit to duplicate the file to the device at the destination specified in the automatic transmission control file 105, i.e., the hard disk as a second memory 1704 in embodiment 4 of the invention. Thereby, the image file B is duplicated into the memory 1704.

Figure 19:
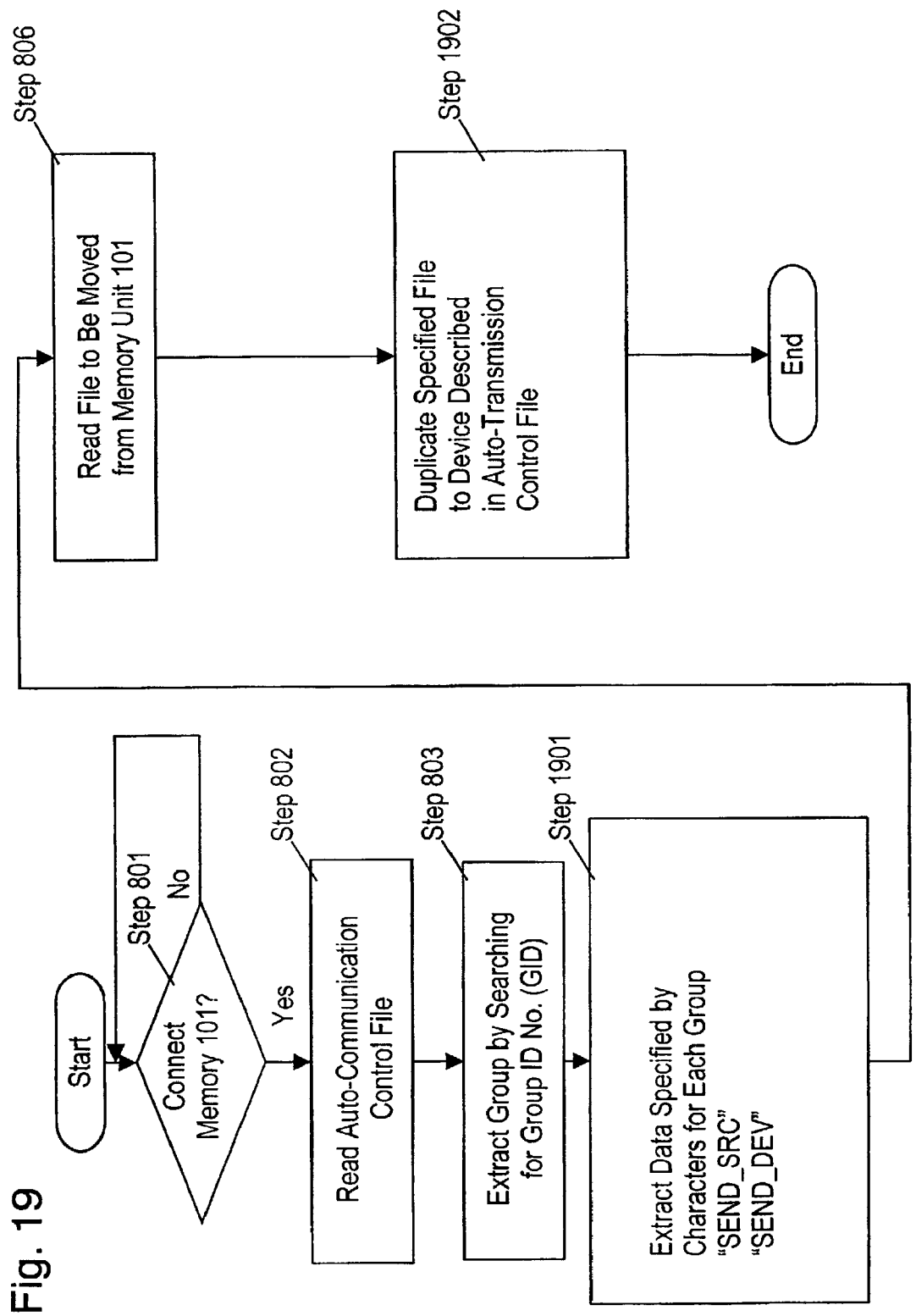
FIG. 19 is a flowchart of automatic transmission operation of embodiment 4.

The operation for the file move is shown in a flowchart in FIG. 19. In FIG. 19, operations at steps 801 to 803 and 806 are the same as those in the flowchart shown in FIG. 8, and the explanation is omitted. At step 1901, information in a group is extracted and acquired. At step 1902, the moving unit 1703 is instructed to move a file to the device at the destination specified in the automatic transmission control file 105, and thereby, the image file B is moved to the device at the destination, i.e., the memory 1704 as the hard disk.

Thus, according to embodiment 4 of the invention, writing the device at the destination in the automatic transmission control file allows a desired file to be automatically duplicated into a desired device at the destination.

In embodiment 4 of the invention, the second memory 1704 is a hard disk, but not limited to this. For example, a magnet-optical disk, other recordable disk device, semiconductor memory such as a memory card, magnetic tape, or others may be effectively used as the memory.

In embodiment 4 of the invention, the memory 1704 may be either detachable memory or fixed memory in the device.

Further in embodiment 4 of the invention, a converter 1502 explained in embodiment 3 of the invention may convert the file read from the memory 101 into a signal of a different format, and then, stores the converted file in the second memory 1704. For example, the image file is converted into a TV signal of an NTSC format, and can be stored in a VHS magnetic tape. Similarly, the image file may be compressed in a JPEG format or MPEG format, and can be stored in a disk media such as a digital versatile disk (DVD).

Embodiment 5

In foregoing embodiments 1 to 3 of the invention, a desired file is transmitted automatically. Among an automatic file transmission system, the embodiment relates to a configuration for exchanging information about performance and features of devices between a device for generating an automatic transmission control file for controlling file transmission and a device for transmitting a file according to the automatic transmission control file. That is, exchanging information about mutual performance and features between the device for generating the automatic transmission control file and the device for transmitting the file allows the file to be processed depending on individual limiting conditions and special functions of the devices so as to contribute to a convenience for a user.

Figure 20:
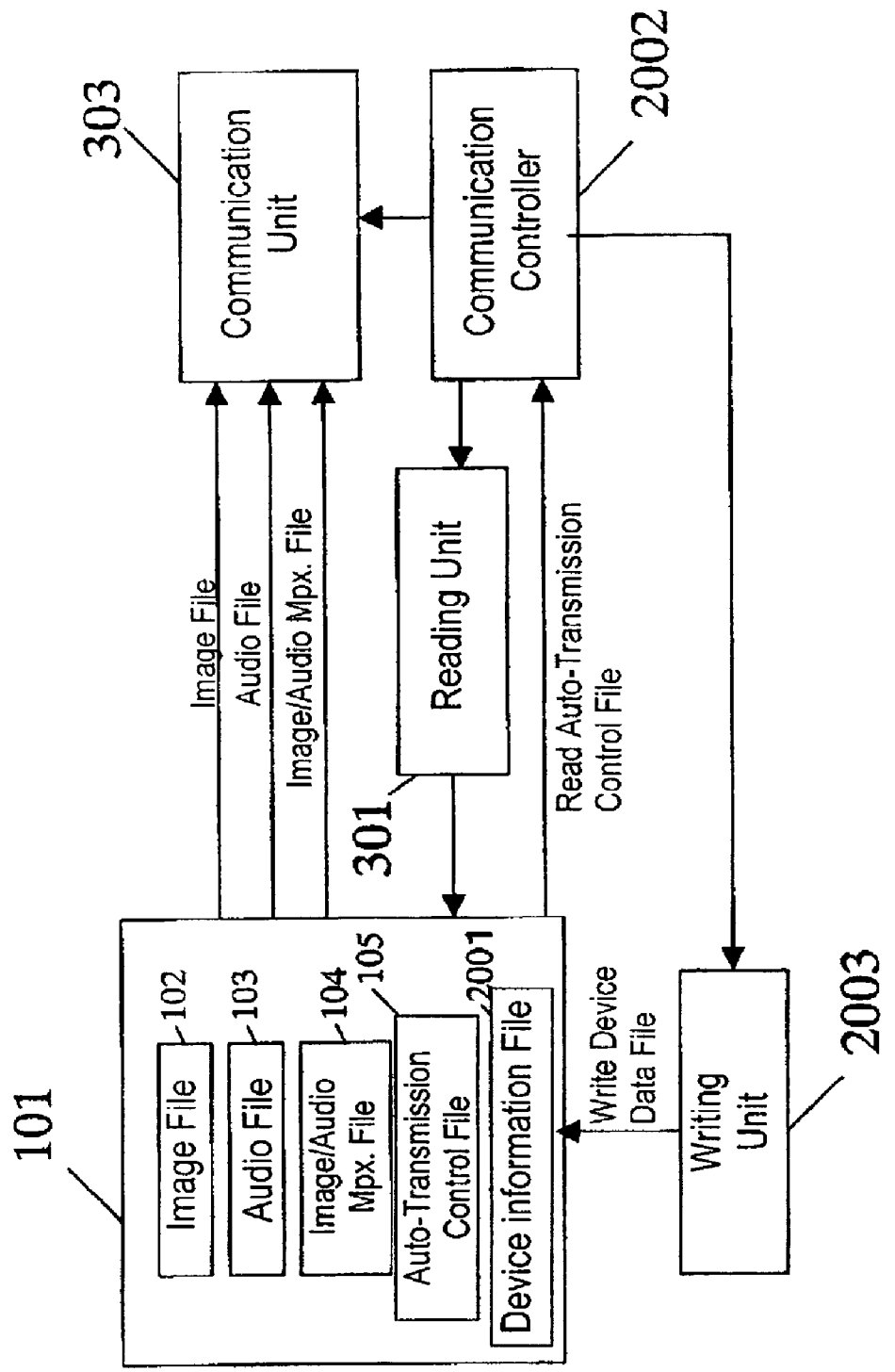
FIG. 20 is a block diagram of the device for transmitting file according to automatic transmission control file in the automatic file transmission system of embodiment 5.

FIG. 20 is a block diagram of the device for transmitting file according to the automatic transmission control file In FIG. 20, a memory 101, image file 102, audio file 103, image/audio multiplex file 104, automatic transmission control file 105, reading unit 301, and communication unit 303 are the same as those in embodiment 1 of the invention shown in FIG. 3, and the explanation is omitted. A device information file 2001 stores the information about the devices included in the automatic file transmission system of the invention. A communication controller 2002 reads the file to be transmitted from the memory 101 according to a description in the automatic transmission control file 105, and controls the communication unit 303 to transmit the file. The controller also controls a writing unit 2003 to write the device information file in the memory 101. The writing unit 2003 is controlled by the communication controller 2002 to write the device information file 2001 in the memory 101.

Figure 21:
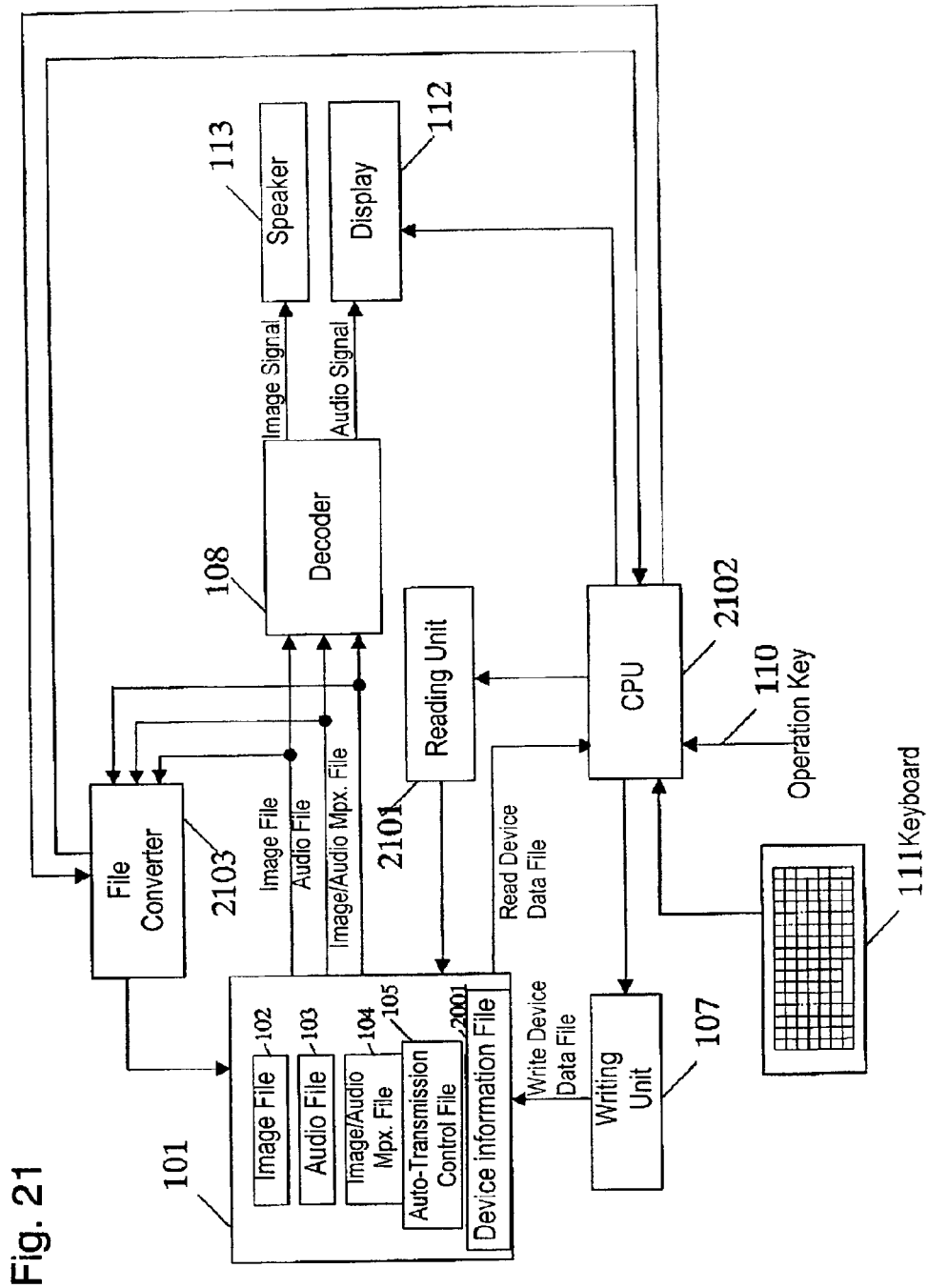
FIG. 21 is a block diagram of the device for generating automatic transmission control file for controlling file transmission in the automatic file transmission system of embodiment 5.

FIG. 21 is a block diagram of the device for generating the automatic transmission control file 105 for controlling file transmission in the automatic file transmission system of the embodiment. In FIG. 21, a memory 101, image file 102, audio file 103, image/audio multiplex file 104, automatic transmission control file 105, writing unit 107, decoder 108, operation key 110, keyboard 111, display 112, and speaker 113 are the same as those in embodiment 1 of the invention shown in FIG. 1, and the explanation is omitted. A reading unit 2101, being similar to the reading unit 106 in embodiment 1 of the invention shown in FIG. 1, further reads the device information file 2001. A CPU 2102, being similar to the CPU 109 in embodiment 1 of the invention shown in FIG. 1, further controls a file converter 2103 based on a description in the device information file read from the memory 101. The file converter 2103 converts the file read from the memory 101 into other file, and the resultant converted file is written into the original memory 101.

An operation in embodiment 5 of the invention having such configuration will be explained below.

At first, when a user connects the memory 101 to the device for transmitting file shown in FIG. 20, the communication controller 2002 controls the writing unit 2003 to write the device information file 2001 in the memory 101. The device information file includes the information about the performance and features of the device for transmitting a file. The information may include a maximum image size of the file transmitted by the communication unit 303. In embodiment 5, the maximum image size of an image transmitted by the communication unit 303 is stored in the device information file 2001, and the size includes a specific values, for example, 160 horizontal pixels and 120 vertical pixels.

Then, the user removes the memory 101 from the device shown in FIG. 20 in order to edit the automatic transmission control file 105, and connects the memory to the device for generating an automatic transmission control file shown in FIG. 21. In this case, in automatic transmission, similarly to embodiment 1 of the invention, the file to be transmitted is image file B, and the automatic transmission control file 105 for this purpose is the same as shown in FIG. 7. The file 105 is generated in the memory 101, and the explanation of the generation of the automatic transmission control file 105 is omitted. The image file B to be transmitted is, for example, composed of 640 horizontal pixels and 480 vertical pixels, and the information about the number of the pixels is written in a header of the image file B.

When the automatic transmission control file 105 is generated in the memory 101, the CPU 2102 controls the reading unit 2101 to read the automatic transmission control file 105 and device information file 2001 in the memory 101, and acquires contents in the files. The device information file 2001 includes the maximum number of pixels that can be transmitted by the communication unit 303 shown in FIG. 20 for an image. In embodiment 5 of the invention, the maximum number of pixels is 160 horizontal pixels and 120 vertical pixels. The automatic transmission control file 105 shows that the file to be transmitted is image file B. Then, the CPU 2102 controls the reading unit 2101 to read the image file B to be transmitted from the memory 101, and sends the file to the file converter 2103. The file converter 2103 interprets the header of the image file B, and detects the number of pixels of the image file B, 640 horizontal pixels and 480 vertical pixels. The result of the detection is returned to the CPU 2102. In this case, as explained in embodiment 1 of the invention, if the memory 101 is directly connected to the device for transmitting a file shown in FIG. 20, the image file B cannot be transmitted normally since the number of pixels of the image file B to be transmitted exceeds a communication capacity of the communication unit 303. Accordingly, the user must edit the image file B again with other image editing device to convert the number of pixels, and this process is complicated for the user.

In embodiment 5 of the invention, the image file B is edited automatically as follows. That is, the maximum number of pixels that can be transmitted by the communication unit 303 is 160 horizontal pixels and 120 vertical pixels, and the CPU 2102 accordingly instructs the file converter 2103 to convert the image file B into an image having a size of 160 horizontal pixels and 120 vertical pixels. According to this instruction, the file converter 2103 generates a file by converting the image file B into the file having a size of 160 horizontal pixels and 120 vertical pixels, and writes the converted file in the memory 101 as a file name "converted image file B".

Consequently, the CPU 2102 edits the automatic transmission control file 105 read out, and changes a file name of the file to be transmitted from "image file B" to "converted image file B", and controls the writing unit 107 to write the file 105 in the memory 101. Contents of the automatic transmission control file 105 written in the memory 101 is shown in FIG.

22. As shown in FIG. 22, the file name of the file to be transmitted indicated after a character string "SEND_SRC" is changed to "converted image file B". An operation of this process is shown in a flowchart in FIG. 23.

Figure 23:
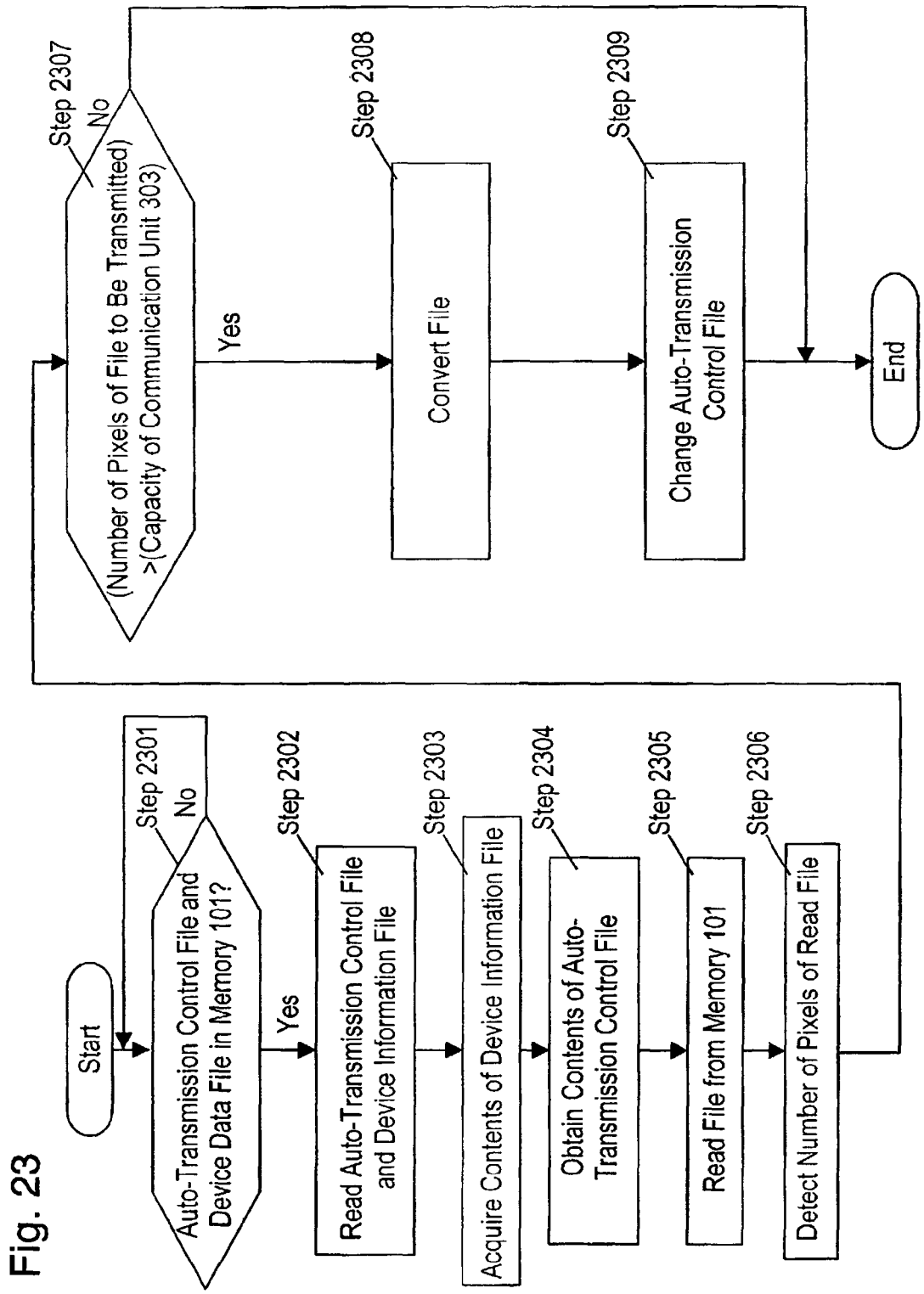
FIG. 23 is a flowchart for explaining file conversion and changing operation of automatic transmission control file of embodiment 5.
Figure 24:
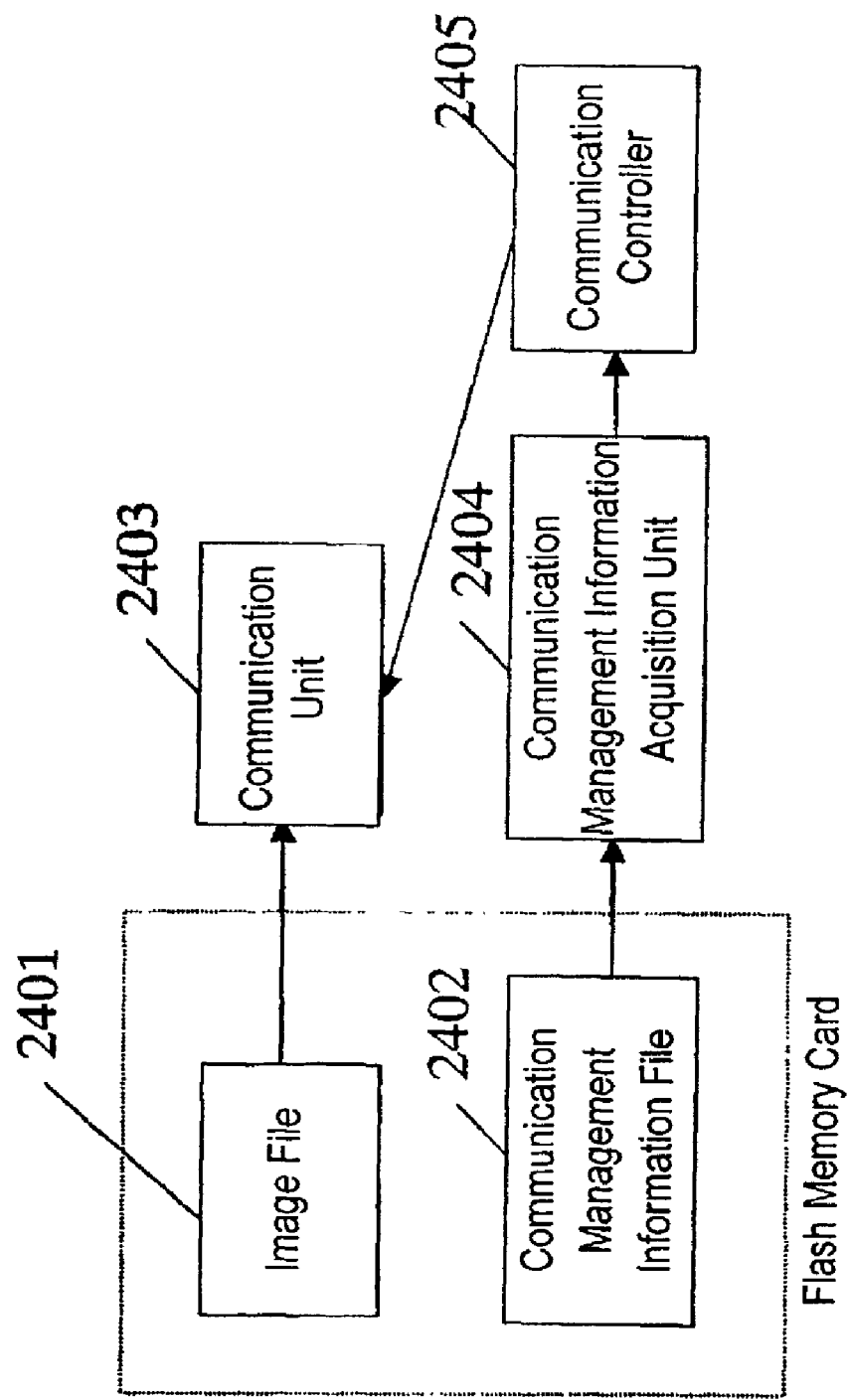
FIG. 24 is a block diagram showing an example of automatic transmission device in a prior art.

In FIG. 23, at step 2301, when both automatic transmission control file 105 and device information file 2001 are stored in the memory 101, and then, at step 2302, the automatic transmission control file 105 and device information file 2001 are read out. The CPU 2102 acquires contents of these two files at next steps 2303 and 2304, and reads the image file B to be transmitted from the memory 101 at step 2305. At step 2306, the number of pixels of the image file B read out is detected by the file converter 2103. When the number of pixels of the detected image file B is larger than the maximum number of pixels that can be transmitted by the communication unit 303 written in the device information file 2001 at step 2307, the file converter 2103 converts the number of pixels of image file B at step 2308. Then, the converter stores the converted file in the memory 101 under a file name of "converted image file B". Finally, at step 2309, the CPU 2102 changes the content of the automatic transmission control file 105, and the process is terminated.

After the automatic transmission control file 105 is thus changed by the CPU 2102, when the memory 101 is connected to the device for transmitting a file according to the automatic transmission control file shown in FIG. 20, this device automatically transmits the converted image file B according to a description of the automatic transmission control file 105 similarly to embodiment 1 of the invention. Since having the number of pixels within the transmission capacity of the communication unit 303 according to the description of the device information file, the converted image file B is transmitted without any problem.

Thus, according to embodiment 5 of the invention, in the automatic file transmission system, the device information file is provided for exchanging information about performance and features of devices between a device for generating an automatic transmission control file for controlling file transmission and a device for transmitting a file according to the automatic transmission control file. And the performance and features of the devices are shared between the device for generating the automatic transmission control file and the device for transmitting the file. Therefore the file can be processed depending on individual limiting conditions and special functions of the devices so as to contribute to the convenience for the user.

In embodiment 5 of the invention, the device information file contains the maximum image size that can be transmitted in image transmission by the communication unit 303, but not limited to this. The file may contain a maximum data amount and maximum number of characters that can be transmitted, a transmission speed, file formats to be transmitted, and presence or absence of a security function.

Also in embodiment 5 of the invention, the device information file specifies the performance and features of devices included in the automatic file transmission system, but not limited to this. For example, between a digital still camera and a printer, or between a digital still camera and a personal computer, the device information file as explained in embodiment 5 of the invention may be shared when exchanging data through detachable memory. In this case, therefore, the file can be processed depending on individual limiting conditions and special functions of the devices, and it is effective to contribute to the convenience for the user. The same effects are obtained when data is exchanged between devices connected through a cable without the detachable memory, or when data is exchanged between devices connected by wireless communication.

In embodiment 5 of the invention the device information file includes the information of the device for transmitting a file according to automatic transmission control file of the automatic file transmission system, but not limited to this. For example, the device information file may specify information of the device for generating the automatic transmission control file. A specific information about the content explained in embodiment 5 of the invention will be explained. The device for generating the automatic transmission control file shown in FIG. 21 does not have a file converter 2103, and can handle the image file having only a size of 640 horizontal pixels and 480 vertical pixels. And the device for transmitting a file according to the automatic transmission control file shown in FIG. 20 includes the file converter 2103. In this case, if the device for generating the automatic transmission control file stores the information of the number of pixels that can be handled by itself in the device information file, and if the device for transmitting a file can fetch the information through the device information file, therefore, the file specified for transmission by the automatic transmission control file can be converted into an image file of 160 horizontal pixels and 120 vertical pixels by the file converter 2103 of the device for transmitting the file automatically. Then, the converted image file can be transmitted automatically by the communication unit 303.

INDUSTRIAL APPLICABILITY

According to the invention, as described above, the information about the file to be transmitted is included automatically as a group in an automatic transmission control file. And, the memory storing a data file and automatic transmission control file is connected to the communication unit, and thus, a desired file can be automatically transmitted to a desired destination according to the automatic transmission control file.

Further, according to the invention, the information about the file to be transmitted may be described automatically in plural groups in an automatic transmission control file. And the memory storing the data file and the automatic transmission control file is connected to the communication unit, and thus, a desired file can be automatically transmitted to one or more desired destinations according to the automatic transmission control file.

Moreover, a destination facsimile number in the automatic transmission control file, and thus, a desired file can be automatically transmitted by facsimile to a desired destination, and an audio file, being converted into characters, can be transmitted.

A device at a destination may be described in the automatic transmission control file, and thus, a desired file can be automatically duplicated to the device at the destination.

According to the invention, still more, in the automatic file transmission system, a device information file is provided for exchanging information about performance and features of devices between a device for generating an automatic transmission control file for controlling file transmission and a device for transmitting a file according to the automatic transmission control file. And thus, the performance and features of the devices are shared between the device for generating the automatic transmission control file and the device for transmitting the file. Therefore the file can be processed depending on individual limiting conditions and special functions of the devices, which is effective to contribute to convenience for a user.

REFERENCE NUMERALS

101 Memory
102 Image File
103 Audio File
104 Image/Audio Multiplex File
105 Automatic Transmission Control File
106 Reading Unit
107 Writing Unit
108 Decoder
109 CPU
110 Operation Key
111 Keyboard
112 Display
113 Speaker
201 File Reproduction Mode Select Key
202 Specified Item Select Key
203 Send Key
204 Return Key
205 Decision Key
206 New Transmission Control File Create Key
207 Group Key
301 Reading Unit
302 Communication Controller
303 Communication Unit
1201 Reading Unit
1202 Communication Controller
1203 Converter
1204 Facsimile Transmitter
1501 Audio Transmitter
1502 Converter
1701 Reading Unit
1702 Communication Controller
1703 Moving Unit
1704 Memory
2001 Device Information File
2002 Communication Controller
2003 Writing Unit
2101 Reading Unit
2102 CPU
2103 File Converter
2401 Image File
2402 Communication Management Information File
2403 Communication Unit
2404 Communication Management Information Acquiring Unit
2405 Communication Controller

The invention claimed is:

1. A transmission information file generating system comprising:
a memory receptor operable to receive a memory which stores data files;
a select/send device operable to select and reselect the data files stored on the memory for reproduction and transmission; and
a processor operable to generate a transmission information file separately from the data files, the transmission information file containing:
a plurality of groups;
each of the plurality of groups containing data identifying information of at least one of the data files selected by the select/send device;
a plurality of group IDs for identifying the plurality of groups, respectively;
each of the plurality of group IDs identifies a particular group, from the plurality of groups, which contains the data identifying information of the at least one data file associated with the particular group identified by the group ID; and
destination address information associated with each of the plurality of group IDs for providing a destination of the at least one data file associated with the particular group identified by the group ID;
wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;
wherein the transmission information file has a predetermined file name which identifies the transmission information file as a file to be used for transmission; and
wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and
wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

2. The transmission information file generating system of claim 1, wherein the address information includes at least one of an electronic mail address of the destination, a facsimile number of the destination, and a telephone number of the destination.

3. The transmission information file generating system of claim 1, wherein the transmission information file contains at least one of an electronic mail address of a sender, a facsimile number of the sender, and a telephone number of the sender, a name of the sender, a title of transmission information, and a message to the destination.

4. The transmission information file generating system of claim 1, further comprising a communication unit operable to transmit the data files according to the transmission information file.

5. The transmission information file generating system of claim 4, wherein the communication unit is operable to transmit the data files by wireless communication or wired communication.

6. The transmission information file generating system of claim 1, wherein at least one of the data files contains image information.

7. The transmission information file generating system of claim 1, wherein at least one of the data files contains audio information.

8. The transmission information file generating system of claim 1, wherein at least one of the data files contains multiplexed image information and audio information.

9. The transmission information file generating system of claim 1, wherein at least one of the data files contains text.

10. The transmission information file generating system of claim 1, wherein at least one of the data files contains an executable program.

11. The transmission information file generating system of claim 1, wherein at least one of the data files is an HTML format file.

12. The transmission information file generating system of claim 1, wherein the data files are of different types.

13. The transmission information file generating system according to claim 1, wherein the transmission information file generated by said processor is useable by an external device to transmit the at least one data file identified in each of the plurality of groups.

14. The transmission information file generating system according to claim 1, wherein information contained in the transmission information file generated by said processor is transmittable to a device which is external to the transmission information file generating system.

15. The transmission information file generating system according to claim 1, wherein the transmission information file is stored independently from the data files stored on the memory such that the transmission information file and data files are independently accessible.

16. The transmission information file generating system according to claim 1, wherein the data identifying information is a file name.

17. The transmission information file generating system according to claim 1, further comprising a digital camera which contains the transmission information file generating system.

18. A transmission information file generating system according to claim 1, wherein the data identifying information and destination address information contained in each of the plurality of groups is preceded by a character string used to identify a category of the information, the character string including a prefix and a suffix.

19. A transmission information file generating system comprising:
a memory which stores data files;
a select/send device operable to select and reselect the data files stored on the memory for reproduction and transmission; and
a processor operable to generate a transmission information file separately from the data files, the transmission information file containing:
a plurality of groups;
each of the plurality of groups containing data identifying information of at least one of the data files selected by the select/send device;
a plurality of group IDs for identifying the plurality of groups, respectively;
each of the plurality of group IDs identifies a particular group, from the plurality of groups, which contains the data identifying information of the at least one data file associated with the particular group identified by the group ID; and
destination address information associated with each of the plurality of group IDs for providing a destination of the at least one data file associated with the particular group identified by the group ID;
wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;
wherein the transmission information file has a predetermined file name which identifies the transmission information file as a file to be used for transmission; and
wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and
wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

20. The transmission information file generating system of claim 19, wherein the memory is detachable.

21. The transmission information file generating system of claim 19, further comprising a communication unit operable to transmit the data files according to the transmission information file by wireless communication or wired communication.

22. The transmission information file generating system of claim 19, wherein the transmission information file is separate from the data files.

23. A transmission information file generating system comprising:
a memory receptor operable to receive a memory which stores data files;
a select/send device operable to select and reselect the data files stored on the memory for reproduction and transmission; and
a processor operable to generate a transmission information file separately from the data files, the transmission information file containing:
a plurality of groups:
each of the plurality of groups containing data identifying information of at least one of the data files selected by the select/send device;
a plurality of group IDs for identifying the plurality of groups, respectively;
each of the plurality of group IDs identifies a particular group, from the plurality of groups, which contains the data identifying information of the at least one data file associated with the particular group identified by the group ID; and
destination address information associated with each of the plurality of group IDs for providing a destination of the at least one data file associated with the particular group identified by the group ID;
wherein the data identifying information contained within each of the plurality of groups is written following the group ID;
wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;

wherein the transmission information file has a predetermined file name which identifies the transmission information file as a file to be used for transmission; and wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

24. A transmission information file generating system comprising:
- a memory which stores data files;
- a select/send device operable to select and reselect the data files stored on the memory for reproduction and transmission; and
- a processor operable to generate a transmission information file separately from the data files, the transmission information file containing:
  - a plurality of groups;
    - each of the plurality of groups containing data identifying information of at least one of the data files selected by the select/send device;
  - a plurality of group IDs for identifying the plurality of groups, respectively;
    - each of the plurality of group IDs identifies a particular group, from the plurality of groups, which contains the data identifying information of the at least one data file associated with the particular group identified by the group ID; and
  - destination address information associated with each of the plurality of group IDs for providing a destination of the at least one data file associated with the particular group identified by the group ID;
- wherein the data identifying information contained within each of the plurality of groups is written following the group ID;
- wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;
- wherein the transmission information file has a predetermined file name which identifies the transmission information file as a file to be used for transmission; and
- wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and
- wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

25. A transmission information file generating device for generating a transmission information file used to transmit data files, said device comprising:
- a select/send device operable to select and reselect data files for reproduction and transmission; and
- a processor operable to generate the transmission information file separately from the data files, the transmission information file containing:
  - a plurality of groups;
    - each of the plurality of groups containing data identifying information of at least one of the data files selected by the select/send device;
  - a plurality of group IDs for identifying the plurality of groups, respectively;
    - each of the plurality of group IDs identifies a particular group, from the plurality of groups, which contains the data identifying information of the at least one data file associated with the particular group identified by the group ID; and
  - destination address information associated with each of the plurality of group IDs for providing a destination of the at least one data file associated with the particular group identified by the group ID;
- wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;
- wherein the transmission information file has a predetermined file name which identifies the transmission information file as a file to be used for transmission; and
- wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and
- wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

26. The transmission information file generating device of claim 25, wherein the data files are of different types.

27. A transmission information file generating device for generating a transmission information file used to transmit data files, said device comprising:
- a select/send device operable to select and reselect data files for reproduction and transmission; and
- a processor operable to generate the transmission information file separately from the data files, the transmission information file containing:
- a plurality of groups;
  - each of the plurality of groups containing data identifying information of at least one of the data files selected by the select/send device;
- a plurality of group IDs for identifying the plurality of groups, respectively;
  - each of the plurality of group IDs identifies a particular group, from the plurality of groups, which contains the data identifying information of the at least one data file associated with the particular group identified by the group ID; and
- destination address information associated with each of the plurality of group IDs for providing a destination of the at least one data file associated with the particular group identified by the group ID;
- wherein the data identifying information contained within each of the plurality of groups is written following the group ID;
- wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;
- wherein the transmission information file has a predetermined file name which identifies the transmission information file as a file to be used for transmission; and
- wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and
- wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

28. A digital camera comprising:
- a memory receptor operable to receive a memory which stores data files;
- a picture capturing unit operable to acquire picture information corresponding to an image and store the picture information as a data file on the memory;
- a select/send device operable to select and reselect the data files stored on the memory for reproduction and transmission; and
- a processor operable to generate a transmission information file separately from the data files, the transmission information file containing:
- a plurality of groups;
  - each of the plurality of groups containing data identifying information of at least one of the data files selected by the select/send device;
- a plurality of group IDs for identifying the plurality of groups, respectively;
  - each of the plurality of group IDs identifies a particular group, from the plurality of groups, which contains the data identifying information of the at least one data file associated with the particular group identified by the group ID; and
- destination address information associated with each of the plurality of group IDs for providing a destination of the at least one data file associated with the particular group identified by the group ID;
- wherein each of the plurality of group IDs contained in the transmission information file is a unique group ID used for identifying a unique group from the plurality of groups contained in the transmission information file and for grouping the data identifying information and destination address information of the at least one data file associated with the unique group as one group for transmission;
- wherein the transmission information file has a predetermined file name which identifies the transmission information file as a file to be used for transmission;
- wherein each of the data identifying information and destination address information associated with at least one of the plurality of groups is provided within an area continuously located between a group ID of the at least one group and a group ID of a next group in the transmission information file such that the plurality of groups are provided in the transmission information file on a group-by-group basis; and
- wherein the transmission information file generated by said processor has a non-hierarchical structure and is used to transmit the at least one data file identified in each of the plurality of groups on a group-by-group basis by automatically reading the transmission information file, searching for a group ID and extracting, as one group, data identifying information and destination address information existing from a line after the group ID to a line before a next group ID.

* * * * *